US012641535B2

(12) United States Patent
Kazmi et al.

(10) Patent No.: US 12,641,535 B2
(45) Date of Patent: May 26, 2026

(54) POWER SAVING MODE FOR POWER SAVING GROUPS

(71) Applicant: Telefonaktiebolaget LM Ericsson (publ), Stockholm (SE)

(72) Inventors: Muhammad Ali Kazmi, Sundbyberg (SE); Santhan Thangarasa, Vällingby (SE); Kazuyoshi Uesaka, Kawasaki (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 311 days.

(21) Appl. No.: 18/249,468

(22) PCT Filed: Oct. 13, 2021

(86) PCT No.: PCT/EP2021/078350
§ 371 (c)(1),
(2) Date: Apr. 18, 2023

(87) PCT Pub. No.: WO2022/084124
PCT Pub. Date: Apr. 28, 2022

(65) Prior Publication Data
US 2023/0388924 A1 Nov. 30, 2023

Related U.S. Application Data

(60) Provisional application No. 63/104,361, filed on Oct. 22, 2020.

(51) Int. Cl.
*H04W 52/02* (2009.01)

(52) U.S. Cl.
CPC ................. *H04W 52/0212* (2013.01); *H04W 52/0225* (2013.01)

(58) Field of Classification Search
CPC ............. H04W 52/02; H04W 52/0209; H04W 52/0212; H04W 52/0222; H04W 52/0225;
(Continued)

(56) References Cited

U.S. PATENT DOCUMENTS

| 2017/0094576 A1 | 3/2017 | Kazmi et al. |
| 2019/0166553 A1 | 5/2019 | Ryoo et al. |

(Continued)

FOREIGN PATENT DOCUMENTS

| WO | WO-2019215342 A1 * | 11/2019 | ........... H04W 76/19 |
| WO | 2020034608 A1 | 2/2020 | |
| WO | 2020193616 A1 | 10/2020 | |
| WO | WO-2021254590 A1 * | 12/2021 | ........... H04W 24/08 |

OTHER PUBLICATIONS

Kim et al., "Evolution of Power Saving Technologies for 5G New Radio", Nov. 2, 2020, IEEE Access ( vol. 8), 198912-198924, 10.1109/ACCESS.2020.3035186 (Year: 2020).*
(Continued)

*Primary Examiner* — Paul H. Masur
(74) *Attorney, Agent, or Firm* — Weisberg I.P. Law, P.A.

(57) ABSTRACT

A method, system and apparatus are disclosed. According to one or more embodiments, a wireless device is provided. The wireless device includes processing circuitry configured to enter a first mode for a plurality of serving cells of a power savings group, PSG, based at least on the plurality of serving cells meeting at least a first criterion, determine a first serving cell fails to meet at least a second criterion, revert to a second mode for the first serving cell based on the determination that the first serving cell fails to meet the at least second criterion, and revert to the second mode for the remaining serving cells of the plurality of serving cells based on the determination that the first serving cell fails to meet the at least second criterion.

20 Claims, 7 Drawing Sheets

(58) Field of Classification Search
CPC ......... H04W 52/0229; H04W 52/0245; H04W
52/0254; H04W 52/0258; H04W 52/028;
Y02D 30/70
See application file for complete search history.

(56) References Cited

U.S. PATENT DOCUMENTS

| | | | |
|---|---|---|---|
| 2020/0100179 A1 | 3/2020 | Zhou et al. | |
| 2020/0275289 A1* | 8/2020 | Thangarasa ............ | H04B 17/24 |
| 2022/0174608 A1* | 6/2022 | Laselva ................ | H04W 24/08 |
| 2023/0284145 A1* | 9/2023 | Da Silva ........... | H04W 52/0235 |
| | | | 370/311 |

OTHER PUBLICATIONS

Li et al., "Power Saving Techniques for 5G and Beyond", Jun. 9, 2020, IEEE Access ( vol. 8), DOI: 10.1109/ACCESS.2020. 3001180, pp. 108675-108690 (Year: 2020).*
International Search Report and Written Opinion dated Jan. 7, 2022 for International Application No. PCT/EP2021/078350 filed Oct. 13, 2021, consisting of 11-pages.
ETSI TS 138 133 V16.5.0; Technical Specification; 5G; NR; Requirements for support of radio resource management (3GPP TS 38.133 version 16.5.0 Release 16); Dec. 2020, consisting of 1610-pages.
Argentinian Office Action and English translation dated Jun. 25, 2025 for Application No. 20210102919, consisting of 14 pages.

\* cited by examiner

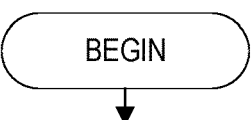

Cause transmission of information indicating whether the wireless device is to one of proceed and at least temporarily stop a power savings mode, at the wireless device, for at least one cell in a power saving group where the information is based on whether a predefined criterion is met
S134

END

FIG. 7

BEGIN

Configure at least a first criterion for the wireless device to use to: enter a first mode for a plurality of serving cells of a power savings group, PSG, based at least on the plurality of serving cells meeting the at least first criterion, and revert to a second mode for a plurality of severing cells of the PSG based at least on one severing cell of the plurality of serving cells failing to meet the at least a second criterion where the first mode is associated with a first measurement period greater than a second measurement period of the second mode
S136

Transmit information to the wireless device associated with one of the at least first criterion and the at least  second criterion
S138

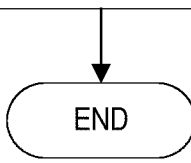

END

FIG. 8

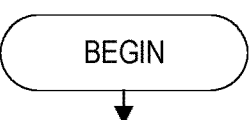

One of proceed and stop a power savings mode, at the wireless device, for at least one cell in a power saving group based on whether a predefined criterion is met
S140

FIG. 9

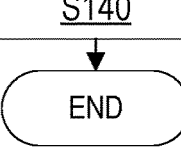

Enter a first mode for a plurality of serving cells of a power savings group, PSG, based at least on the plurality of serving cells meeting at least a first criterion
S142

Determine a first serving cell of the plurality of serving cells fail to meet at least a second criterion
S144

Revert to a second mode for the first serving cell based on the determination that the first serving cell fails to meet the at least second criterion
S146

Revert to the second mode for the remaining serving cells of the plurality of serving cells based on the determination that the first serving cell fails to meet the at least second criterion where the first mode is associated with a first measurement period greater than a second measurement period of the second mode
S148

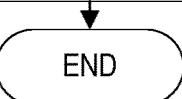

FIG. 10

POWER SAVING MODE FOR POWER SAVING GROUPS

CROSS-REFERENCE TO RELATED APPLICATIONS

This application is a Submission Under 35 U.S.C. § 371 for U.S. National Stage Patent Application of International Application No.: PCT/EP2021/078350, filed Oct. 13, 2021 entitled "POWER SAVING MODE FOR POWER SAVING GROUPS," which claims priority to U.S. Provisional Application No. 63/104,361, filed Oct. 22, 2020, entitled "METHOD OF POWER SAVING CELL GROUPING," the entireties of both of which are incorporated herein by reference.

FIELD

The present disclosure relates to wireless communications, and in particular, to a power saving mode implementation for at least one cell in a power savings group.

BACKGROUND

Radio link monitoring (RLM) in $3^{rd}$ Generation Partnership Project (3GPP) New Radio (NR, also referred to as $5^{th}$ Generation (5G)) RLM evaluation in NR is performed based on up to 8 RLM reference signal (RLM-RS) resources configured by the network node, where:

One RLM-RS resource can be either one synchronization signal (SS)/physical broadcast channel (PBCH) block or one channel state information-reference signal (CSI-RS) resource/port, The RLM-RS resources are wireless device (e.g., UE)-specifically configured.

When the wireless device is configured to perform RLM on one or more RLM-RS resource(s), Periodic in-sync (IS) is indicated if the estimated link quality corresponding to hypothetical physical downlink control channel (PDCCH) block error rate (BLER) based on at least 1 RLM-RS resource among all configured RLM-RS resource(s) is above $Q_{in}$ threshold, and Periodic out-of-sync (OOS) is indicated if the estimated link quality corresponding to hypothetical PDCCH BLER based on all configured RLM-RS resource(s) is below $Q_{out}$ threshold.

Examples of $Q_{out}$ and $Q_{in}$ are 10% and 2% respectively.

According to Third Generation Partnership Project (3GPP) Technical Specification (TS) 38.133 V16.5.0, Radio link procedure is applicable for:

PCell in SA NR, NR-DC and NE-DC operation mode, and/or

PSCell in NR-DC and EN-DC operation mode.

SS/PBCH block further includes channels/signals (e.g., primary synchronization signal (PSS), second synchronization signal (SSS), PBCH, demodulation reference signal (DMRS) for PBCH, CSI-RS, etc.) periodically for the wireless device to synchronize with the network node and to acquire channel information. Such channels/signals are transmitted at the same transmission burst called discovery reference signals (DRS). DRS is transmitted by the network node periodically with a certain periodicity, e.g., 20 ms, 40 ms, 80 ms, 160 ms, etc. Each SS block (SSB) or SSB-based RRM measurement timing configuration (SMTC) occasion, which occurs periodically contains one or more SSB/PBCH signals. SMTC contains, for example, SS/PBCH blocks (or SSB), CSI-RS, PDSCH for transmitting system information block type 1 (SIB1). The wireless device is configured with information about SSB on cells of a carrier and called as SSB-based measurement timing configuration (SMTC), which comprises SMTC periodicity, SMTC occasion length in time or duration, SMTC time offset with respect to reference time (e.g., serving cell's system frame number (SFN)).

The wireless device is configured with one or more RLM-RS resources for each of which the wireless device estimates the downlink radio link quality (e.g., signal to noise ratio (SNR), signal to interference ratio (SINR), received signal receive power (RSRP)), and compares it to the thresholds $Q_{out}$ and $Q_{in}$ (derived based on a hypothetical PDCCH BLER) for the purpose of monitoring downlink radio link quality of the cell. More specifically, the wireless device is able to evaluate whether the downlink radio link quality on the configured RLM-RS resource estimated over the last OOS (e.g., out of synch) evaluation period ($T_{Evaluate\_out}$) becomes worse than the threshold $Q_{out}$ within $T_{Evaluate\_out}$ evaluation period, and the wireless device is able to evaluate whether the downlink radio link quality on the configured RLM-RS resource estimated over the last IS evaluation period ($T_{Evaluate\_in}$) becomes better than the threshold $Q_{in}$ within $T_{Evaluate\_in}$ evaluation period.

In frequency range #2 (FR2) (mmwave, e.g., for frequencies between 24 GHz and 52.6 GHz), the RLM evaluation period additionally applies Rx beam sweeping factor, N, where it is assumed that the wireless device tries/attempts to receive RLM-RS with different Rx beam configuration to measure the RLM-RS. Example of N is 8. This means OOS and IS evaluation periods in FR2 are N times longer than the corresponding OOS and IS evaluation periods in frequency range #1(FR1) (e.g., frequencies between 400 MHz and 7 GHz).

Beam Management in NR

Beam management is a procedure to maintain the beam connection for transmission and reception. The beam management is also interchangeably called as link recovery procedure. The beam management includes one or more of beam related procedures, e.g., beam establishment, beam failure recovery, and beam indication (or beam reporting).

Beam establishment is a procedure where the wireless device selects the best (strongest) beam when it connects to the network node. In order to identify the beam, the network node (e.g., gNB) transmits different SS/PBCH block and/or CSI-RS per beam. The beam establishment is usually performed at the same time the wireless device performs the initial cell search. At the initial cell search, the wireless device searches for the strongest SS/PBCH block and identifies its location in time domain, because it corresponds to the beam identifier (ID). After the wireless device finds the beam, the wireless device attempts to connect to the network node using this beam. While the wireless device connects to the network node, the wireless device measures the downlink link quality of connecting beam. If the link quality level is below a threshold, the wireless device triggers the beam failure and start the beam recovery procedure.

Beam failure recovery is a procedure when the wireless device updates the beam in the same cell when the current beam becomes weak due to the channel condition changes, e.g., wireless device location change or rotation. Beam indication is a procedure where the wireless device reports the beam condition (e.g., received signal power on the beam) to the network node as CSI reporting.

According to 3GPP TS 38.133 V16.5.0, the beam management procedure is applicable for:

Primary Cell (PCell) in SA, NR-DC, or NE-DC operation mode,

Primary Secondary Cell (PSCell) in NR-DC and EN-DC operation mode, or

Secondary Cell (SCell) in carrier aggregation.

The Beam recovery procedure is a procedure to recover beam connection when the beam wireless device is monitoring and becomes weak. The wireless device measures the channel quality of the periodic SS/PBCH block and/or CSI-RS resources (q0) in a serving cell. If the measured quality is below the threshold $Q_{out}$ LR, corresponding to hypothetical PDCCH BLER of 10%, the wireless device physical layer indicates beam failure to the MAC layer. This event is called beam failure detection (BFD).

In FR2, the BFD evaluation period additionally applies Rx beam sweeping factor, N, where it is assumed that the wireless device tries to receive RLM-RS with different Rx beam configuration to measure the BFD-RS. Example of N is 8. This means that the BFD evaluation period in FR2 is N times longer than the BFD evaluation period in FR1.

After BFD, the wireless device searches candidate beams from the configured CSI-RS and/or SS/PBCH block resources for candidate beam detection (q1) in the serving cell. The wireless device determines one of the beams in q1 whose Open Systems Interconnection (OSI) Model Layer 1 (L1) L1-RSRP exceeds the threshold rsrp-Threshold, signaled from the network node. This procedure is called candidate beam detection (CBD).

After determining the new beam in PCell/PSCell, the wireless device reports the selected beam with the random access procedure, where the wireless device transmits random access preamble on the PRACH corresponding to the SS/PBCH block and/or CSI-RS resource. After determining the new beam in SCell, the wireless device reports the selected beam with the Beam failure recovery (BFR) message in MAC CE.

In FR2, the CBD evaluation period additionally applies Rx beam sweeping factor, N, where it is assumed that the wireless device tries to receive CBD-RS with different Rx beam configuration to measure the CBD-RS. Example of N is 8. PCBD is the scaling factor depending on the configured cells which may be the same as CBD evaluation in FR1. This means the CBD evaluation period in FR2 is N times longer than the CBD evaluation period in FR1.

L1-RSRP/L1-SINR Reporting in NR

L1-RSRP reporting is a part of the CSI reporting procedure and the wireless device reports the received power of the configured number of beams. The network node uses the information to determine which beam is to be used to transmit data (PDCCH/PDSCH). L1-RSRP reporting is configured as periodic, aperiodic, or semi-persistent. For the periodic reporting, the wireless device transmits L1-RSRP on physical uplink control channel (PUCCH) according to the periodicity configured by the network node. For the aperiodic L1-RSRP reporting, the wireless device transmits L1-RSRP on the physical uplink shared channel (PUSCH) after the wireless device receives CSI request in downlink control information (DCI). For the semi-persistent L1-RSRP reporting, the wireless device transmits L1-RSRP reporting on PUSCH or PUCCH according to the periodicity specified by the higher layer. For the semi-persistent reporting, the wireless device stops L1-RSRP reporting after the configured number of report transmissions. The reporting period is given by $T_{Report}$.

In FR2, the L1-RSRP measurement period additionally applies Rx beam sweeping factor, N, where it is assumed that the wireless device tries to receive SSB with different Rx beam configuration to measure the SSB. Example of N is 8. This means the L1-RSRP measurement period in FR2 is N times longer than the L1-RSRP measurement in FR1.

Similar to L1-RSRP reporting, L1-SINR reporting is also a part of the CSI reporting procedure and the wireless device reports the ratio of received power of the channel measurement resources (CMR) and received power of the interference measurement resource (IMR). 3GPP assumes CMR is SSB or CSI-RS, and IMR is Non-zero-power CSI-RS (NZP-CSI-RS) or zero-power CSI-RS (ZP-CSI-RS).

In FR2, the L1-SINR measurement period additionally applies reception (Rx) beam sweeping factor, N, where it is assumed the wireless device tries to receive SSB and IMR with different Rx beam configuration to measure the SSB and IMR. Example of N is 8. This means L1-SINR measurement period in FR2 is N times longer than the L1-SINR measurement in FR1.

Both L1-RSRP and L1-SINR reporting are part of beam indication or beam reporting.

However, in NR the wireless device can be configured with certain multicarrier (MC) operation, which is a feature to help increase data rate and/or extend the service coverage. Examples of MC operations are carrier aggregation (CA), dual connectivity (DC), etc. There are different types of MC configurations, whose usage depend on both network implementation, required data rate and wireless device capability. The wireless device capability (i.e., types of MC configurations supported by the wireless device) depends on the wireless device architecture, complexity, cost, impact on wireless device power consumption, etc. The wireless device power consumption increases with the increase in the number of carriers configured for certain MC. Also, one or more carriers configured for certain MC may operate using shared resources, e.g., they may use common RF front end such as common transmission power amplifier (e.g., TPA), reception amplifier (e.g., low noise amplifier (LNA)), digital-to-analog/analog-to-digital converters or filters, etc. The RLM and BM procedures are used in radio resource control (RRC) connected state. In this state, the wireless device can also be configured with multicarrier (MC) operation. In existing systems, the implication on the wireless device power consumption when the wireless device is configured with MC is unknown given the strict requirements related to RLM and/or BLM procedures in existing systems.

SUMMARY

Some embodiments advantageously provide methods, systems, and apparatuses for a power saving mode implementation for at least one cell in a power savings group.

According to one or more embodiments, a wireless device is configured with a power saving cell group (PSG), including at least N number of cells, where N≥2.

In a first example, if the wireless device obtains information that it is operating or is expected to operate at least L1 number of cells belonging to PSG in a power saving mode (PSM) then the wireless device also operates at least M1 additional cells belonging to the PSG in PSM, where (L1+M1)≤N. In one or more embodiments, such as a special case: N=2 and L1=M1=1.

In a second example (where it is assumed that the wireless device is already operating cells in PSM mode), if the wireless device obtains information that it is unable to continue operating or not operating anymore at least L2 number of cells belonging to PSG in a power saving mode (PSM) then the wireless device does not operate at least M2 additional cells belonging to the PSG in PSM, where (L2+

5

M2)≤N. In one or more embodiments such as a special case: N=2 and L2=M2=1. In one specific example, if the wireless device is scheduled on at least one cell belonging to PSG then the wireless device may have to operate in normal mode in that cell. In this case, the wireless device also switches to the normal operation in the remaining cells in PSG.

The PSG can be pre-defined or it can be configured by the network node, e.g., via lower layer signal such as DCI, via higher layer signaling such as RRC, etc. One specific example of PSG includes cells operating on carriers, which are within the same frequency band (e.g., serving cells in intra-band contiguous or non-contiguous CA). In one example, the PSG can be dynamic which is created and modified autonomously in the wireless device while the MuC configurations changes in time.

The wireless device operating in PSM in the cell is allowed to perform relaxed measurements on one or more signals, e.g., performing measurements over longer measurement time compared to a reference measurement time. For a wireless device operating cell in PSM, the wireless device can be allowed to evaluate RLPs procedures less frequently and report the result to the higher layers less frequently.

The wireless device obtains information whether it is operating or is expected to operate one or more cells in PSM or not, based on one or more of the following:

indication received from the network node, e.g., the network node determines that wireless device can operate the cell in PSM based on one or more criteria and informs the wireless device of the determination via the indication.

autonomously by the wireless device based on one or more pre-defined rules, which involves evaluation of one or more criteria.

Examples of criteria used by the wireless device and/or network node for determining whether the wireless device can operate in the PSM are:

Wireless device speed, e.g., PSM is allowed if the wireless device speed is low.

Wireless device location in a cell, e.g., PSM is allowed if the wireless device is not at the cell edge.

Wireless device speed and wireless device location in a cell, e.g., PSM is allowed if the wireless device speed is low, and, wireless device is not at the cell edge.

Therefore, one or more embodiments described herein provide a method that enables wireless device power saving for wireless devices configured with multiple serving cells.

The wireless device behavior for applying relaxed requirements for power saving when configured with multiple serving cells is defined as described herein.

The method may provide the network node with the flexibility to adapt scheduling on multiple serving cells of the wireless device when wireless device is applying relaxed requirements on multiple serving cells. For example, the method prevents wastage of scheduling grants, i.e., avoid frequent scheduling on serving cells when wireless device is applying relaxed requirements. In general, relaxed requirements (or configurations) may be compared to normal operating requirements (or configurations) where relaxed requirements are different and/or a modification of normal operating requirements and provide power savings over the normal operating requirements. For example, relaxed measurements on one or more signals may correspond to performing measurements over longer measurement time (e.g., relaxed requirement) compared to a reference measurement time (i.e., normal operating requirement), thereby providing power savings.

According to one aspect of the disclosure, a wireless device configured to communicate with a network node is provided. The wireless device includes processing circuitry configured to enter a first mode for a plurality of serving cells of a power savings group, PSG, based at least on the plurality of serving cells meeting at least a first criterion, determine a first serving cell of the plurality of serving cells fail to meet at least a second criterion, revert to a second mode for the first serving cell based on the determination that the first serving cell fails to meet the at least second criterion, and revert to the second mode for the remaining serving cells of the plurality of serving cells based on the determination that the first serving cell fails to meet the at least second criterion. The first mode is associated with a first measurement period greater than a second measurement period of the second mode.

According to one or more embodiments of this aspect, the at least first criterion is based on at least one of: a speed of the wireless device, a location of the wireless device in a serving cell, and a variation in a radio condition for the wireless device. According to one or more embodiments of this aspect, the at least second criterion is based on at least one of a speed of the wireless device, a location of the wireless device in a serving cell, and a variation in a radio condition for the wireless device. According to one or more embodiments of this aspect, the at least first criterion is met based one at least one of the speed of the wireless device being below a first threshold, a signal measurement of a serving cell being above a second threshold, and a variation in signal measurements over a predefined time being below a third threshold. According to one or more embodiments of this aspect, in the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

According to one or more embodiments of this aspect, the location of the wireless device in the serving cell is determined based on a signal measurement where the signal measurement indicates the wireless device is in a predefined area of one of the serving cells. According to one or more embodiments of this aspect, the plurality of serving cells is configured for intra-band carrier aggregation. According to one or more embodiments of this aspect, the processing circuitry is further configured to receive information to allow the wireless device to trigger the entering of the first mode and trigger the reverting to the second mode. According to one or more embodiments of this aspect, the information indicates the at least first criterion.

According to one or more embodiments of this aspect, the plurality of serving cells is associated with a first type of deployment scenario where the first type of deployment scenario is based on at least one of a physical location of each of the plurality of serving cells with respect to each other, a relation between timings of the plurality serving cells, and a coverage area of each of the plurality of serving cells. According to one or more embodiments of this aspect, the first mode corresponds to a power saving mode in which the wireless device consumes less power than the second mode. According to one or more embodiments of this aspect, the processing circuitry is further configured to one of evaluate the at least first criterion periodically, evaluate the at least first criterion based on at least one condition, and evaluate the at least first criterion based on a message received from the network node.

According to one or more embodiments of this aspect, the processing circuitry is further configured to one of evaluate the at least second criterion periodically, evaluate the at least second criterion based on at least one condition, and evaluate the at least second criterion based on a message received from the network node. According to one or more embodiments of this aspect, the at least one condition is based on one of a variation in signals between the network node and wireless device, a quantity of cells changes the wireless device has performed over a predefined time duration, a predefined change of wake-up signal configurations, and a battery power threshold for the wireless device where the battery power threshold is one of configured by the network node and autonomously determined by the wireless device.

According to another aspect of the disclosure, a network node configured to communicate with a wireless device is provided. The network node includes processing circuitry configured to configure at least a first criterion for the wireless device to use to: enter a first mode for a plurality of serving cells of a power savings group, PSG, based at least on the plurality of serving cells meeting the at least first criterion, and revert to a second mode for a plurality of severing cells of the PSG based at least on one severing cell of the plurality of serving cells failing to meet the at least a second criterion where the first mode is associated with a first measurement period greater than a second measurement period of the second mode. The processing circuitry is further configured to transmit information to the wireless device associated with one of the at least first criterion and the at least second criterion.

According to one or more embodiments of this aspect, the at least first criterion is based on at least one of: a speed of the wireless device, a location of the wireless device in a serving cell, and a variation in a radio condition for the wireless device. According to one or more embodiments of this aspect, the at least second criterion is met based one at least one of a speed of the wireless device, a location of the wireless device in a serving cell, and a variation in a radio condition for the wireless device. According to one or more embodiments of this aspect, the location of the wireless device in the serving cell is determined based on a signal measurement where the signal measurement indicates the wireless device is in a predefined area of one of the serving cells.

According to one or more embodiments of this aspect, the at least first criterion is met based on at least one of the speed of the wireless device being below a first threshold, a signal measurement of a serving cell being above a second threshold, and a variation in signal measurements over a predefined time is below a third threshold. According to one or more embodiments of this aspect, the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI. According to one or more embodiments of this aspect, the plurality of serving cells are configured for intra-band carrier aggregation.

According to one or more embodiments of this aspect, plurality of serving cells is associated with a first type of deployment scenario where the first type of deployment scenario is based on at least one of a physical location of each of the plurality of serving cells with respect to each other, a relation between timings of the plurality serving cells, and a coverage area of each of the plurality of serving cells. According to one or more embodiments of this aspect, the first mode corresponds to a power saving mode that is configured to consume less wireless device power than the second mode. According to one or more embodiments of this aspect, the processing circuitry is further configured to configure the at least second criterion for the wireless device to use.

According to another aspect of the disclosure, a method implemented by a wireless device that is configured to communicate with a network node is provided. A first mode for a plurality of serving cells of a power savings group, PSG, is entered based at least on the plurality of serving cells meeting at least a first criterion. A determination is made that a first serving cell of the plurality of serving cells fail to meet at least a second criterion. A second mode for the first serving cell is reverted to based on the determination that the first serving cell fails to meet the at least second criterion. The second mode for the remaining serving cells of the plurality of serving cells is reverted to based on the determination that the first serving cell fails to meet the at least second criterion. The first mode is associated with a first measurement period greater than a second measurement period of the second mode.

According to one or more embodiments of this aspect, the at least first criterion is based on at least one of: a speed of the wireless device; a location of the wireless device in a serving cell; and a variation in a radio condition for the wireless device. According to one or more embodiments of this aspect, the at least second criterion is based on at least one of a speed of the wireless device, a location of the wireless device in a serving cell; and a variation in a radio condition for the wireless device. According to one or more embodiments of this aspect, the at least first criterion is met based one at least one of: the speed of the wireless device being below a first threshold; a signal measurement of a serving cell being above a second threshold; and a variation in signal measurements over a predefined time being below a third threshold.

According to one or more embodiments of this aspect, the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI. According to one or more embodiments of this aspect, the location of the wireless device in the serving cell is determined based on a signal measurement, the signal measurement indicating the wireless device is in a predefined area of one of the serving cells. According to one or more embodiments of this aspect, the plurality of serving cells is configured for intra-band carrier aggregation.

According to one or more embodiments of this aspect, information to allow the wireless device to trigger the entering of the first mode and trigger the reverting to the second mode is received. According to one or more embodiments of this aspect, the information indicates the at least first criterion. According to one or more embodiments of this aspect, the plurality of serving cells is associated with a first type of deployment scenario where the first type of deployment scenario is based on at least one of a physical location of each of the plurality of serving cells with respect to each other, a relation between timings of the plurality serving cells, and a coverage area of each of the plurality of serving cells.

According to one or more embodiments of this aspect, the first mode corresponds to a power saving mode in which the wireless device consumes less power than the second mode. According to one or more embodiments of this aspect, one of: the at least first criterion is evaluated periodically, the at least first criterion is evaluated based on at least one condition, and the at least first criterion is evaluated based on a message received from the network node. According to one or more embodiments of this aspect, one of: the at least second criterion is evaluated periodically, the at least second criterion is evaluated based on at least one condition, and the at least second criterion is evaluated based on a message received from the network node. According to one or more embodiments of this aspect, the at least one condition is based on one of: a variation in signals between the network node and wireless device; a quantity of cells changes the wireless device has performed over a predefined time duration; a predefined change of wake-up signal configurations; and a battery power threshold for the wireless device where the battery power threshold is one of configured by the network node and autonomously determined by the wireless device.

According to one or more embodiments, a method implemented by a network node configured to communicate with a wireless device is provided. At least a first criterion is configured for the wireless device to use to: enter a first mode for a plurality of serving cells of a power savings group, PSG, based at least on the plurality of serving cells meeting the at least first criterion, and revert to a second mode for a plurality of severing cells of the PSG based at least on one severing cell of the plurality of serving cells failing to meet the at least a second criterion where the first mode is associated with a first measurement period greater than a second measurement period of the second mode. Information is transmitted to the wireless device associated with one of the at least first criterion and the at least second criterion.

According to one or more embodiments of this aspect, the at least first criterion is based on at least one of: a speed of the wireless device, a location of the wireless device in a serving cell, and a variation in a radio condition for the wireless device. According to one or more embodiments of this aspect, the at least second criterion is met based one at least one of a speed of the wireless device, a location of the wireless device in a serving cell, and a variation in a radio condition for the wireless device. According to one or more embodiments of this aspect, the location of the wireless device in the serving cell is determined based on a signal measurement where the signal measurement indicates the wireless device is in a predefined area of one of the serving cells.

According to one or more embodiments of this aspect, the at least first criterion is met based on at least one of: the speed of the wireless device being below a first threshold, a signal measurement of a serving cell being above a second threshold, and a variation in signal measurements over a predefined time being below a third threshold. According to one or more embodiments of this aspect, the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI. According to one or more embodiments of this aspect, the plurality of serving cells are configured for intra-band carrier aggregation.

According to one or more embodiments of this aspect, the plurality of serving cells is associated with a first type of deployment scenario where the first type of deployment scenario is based on at least one of a physical location of each of the plurality of serving cells with respect to each other, a relation between timings of the plurality serving cells, and a coverage area of each of the plurality of serving cells. According to one or more embodiments of this aspect, the first mode corresponds to a power saving mode that is configured to consume less wireless device power than the second mode. According to one or more embodiments of this aspect, the at least second criterion is configured for the wireless device to use.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart of an example process in a network node according to some embodiments of the present disclosure;

FIG. 8 is a flowchart of another example process in a network node according to some embodiments of the present disclosure;

FIG. 9 is a flowchart of an example process in a wireless device according to some embodiments of the present disclosure;

FIG. 10 is a flowchart of another example process in a wireless device according to some embodiments of the present disclosure.

DETAILED DESCRIPTION

Figure 1:
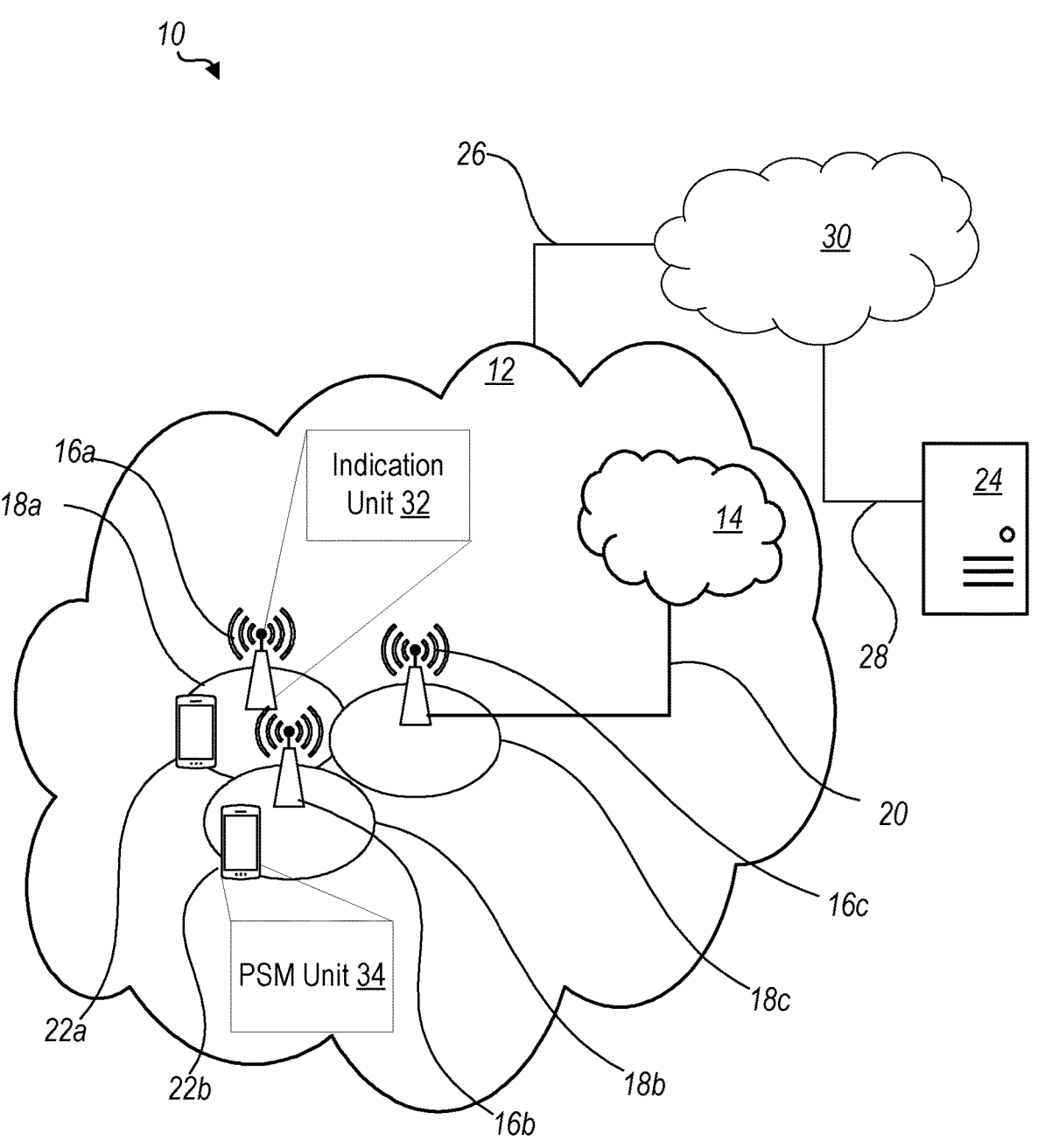
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to a power saving mode implementation for at least one cell in a power savings group.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), ng-eNB, transmission reception point (TRP), multi-standard radio (MSR) radio node such as MSR BS, transmission points, reception points, an external node (e.g., 3rd party node, a node external to the current network), nodes in distributed antenna system (DAS), a spectrum access system (SAS) node, an element management system (EMS), core network node (e.g., MSC, MME, etc.), O&M, OSS, SON, positioning node or location server (e.g., E-SMLC), MDT, test equipment (e.g., physical node and/or software), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, drone, ProSe UE, V2V UE, V2X, UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term radio access technology, or RAT, may refer to any RAT, e.g., UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The wireless device performs measurements on reference signal (RS). Examples of RS includes discover signal or discovery reference signal (DRS), SSB, CSI-RS, CRS, DMRS, PSS, SSS etc. Examples of measurements are cell identification (e.g., PCI acquisition, cell detection), Reference Symbol Received Power (RSRP), Reference Symbol Received Quality (RSRQ), secondary synchronization RSRP (SS-RSRP), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, radio link quality, Radio Link Monitoring (RLM), which consists of Out of Synchronization (out of sync) detection and In Synchronization (in-sync) detection, Layer-1 RSRP (L1-RSRP), Layer-1 SINR (L1-SINR), etc.

The term radio link procedure (RLP) used herein may refer to any procedure performed by the wireless device on radio signals operating between the wireless device and a cell, e.g., between the wireless device and SpCell, between the wireless device and SCell, etc. Examples of RLP are RLM, BM, one or more procedures related to RLM (e.g., out of sync and/or in-sync evaluation, radio link failure detection), one or more procedures related to BM (e.g. BFD, CBD, L1-RSRP reporting, L1-SINR reporting etc), etc.

The term multicarrier (MC) operation used herein refer to any wireless device operation comprising two or more carrier frequencies. The carrier frequency is also called as component carrier (CC), frequency layer, frequency channel etc. In one specific example, the MC operation includes a wireless device configured with at least two serving cells where each serving cell operates on or belong to certain carrier frequency or CC. Examples of MC operations are carrier aggregation (CA), dual connectivity (DC), multiconnectivity (MuC) etc. Examples of serving cells are special cell (SpCell), secondary cell (SCell) etc. Examples of SpCell are primary cell (PCell), primary secondary cell (PSCell) etc. The carrier frequencies of SpCell, SCell, PCell and PSCell are called as special CC (SpCC) or simply SpC, secondary CC (SCC), primary CC (PCC) and primary secondary CC (PSCC) or simply PSC respectively. CA comprising a PCell and at least one SCell. DC comprising a master cell group (MCG) which contains at least PCell and a secondary cell group (SCG). Each of MCG and SCG may further contain one or more SCells. PCell manages (e.g., configures, changes, release, etc.) all SCells in MCG and PSCell in SCG. PSCell manages all SCells in SCG. The cells in MCG and SCG may belong to the same RAT (e.g., all cells are NR in both MCG and SCG like in NR-DC) or they may belong to different RATs (e.g., LTE cells in MCG and NR cells in SCG like in EN-DC or NR cells in MCG and LTE cells in SCG like in NE-DC).

The term relaxed mode or relaxed operational mode used herein refer to performing certain RLP, which is associated with one or more relaxed requirements compared to those associated with the normal mode of operation of the RLP. The normal mode (NM) is interchangeably called as legacy mode, mode without any relaxation etc. The corresponding requirements associated with NM are also called as reference requirements, legacy requirements, normal requirements etc. Examples of requirements are measurement time, measurement accuracy, measurement reporting periodicity, measurement etc. Examples of measurement time are evaluation period or measurement period, e.g., L1 measurement period, L1-RSRP measurement period, L1-SINR measurement period, OOS evaluation period, IS evaluation period, BFD evaluation period, BFD evaluation period, L1 indication interval, IS indication interval, OOS indication interval, BFD indication interval etc. Examples of measurement accuracy are L1-RSRP accuracy (e.g., within $\pm X1$ dB with respect to reference L1-RSRP value), L1-SINR accuracy (e.g., within $\pm X2$ dB with respect to reference L1-SINR value).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a power saving mode implementation for at least one cell in a power savings group.

Referring now to the drawing figures, in which like elements are referred to by like reference numerals, there is shown in FIG. 1 a schematic diagram of a communication system according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to perform one or more network node 16 functions described herein such as with respect to a power saving mode implementation for at least one cell 18 in a power savings group. A wireless device 22 is configured to include a PSM unit 34 which is configured to perform one or more wireless device 22 functions as described herein such as with respect to a power saving mode implementation for at least one cell 18 in a power savings group.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an informant unit 54 configured to enable the service provider to receive, analyze, transmit, determine, schedule, provide, relay, forward, communicate, store, etc., information related to a power saving mode implementation for at least one cell 18 in a power savings group.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an indication unit 32 configured to perform one or more wireless device 22 functions as described herein such as with respect to a power saving mode implementation for at least one cell 18 in a power savings group.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a PSM unit 34 configured to perform one or more network node 16 functions as described herein such as with respect to a power saving mode implementation for at least one cell 18 in a power savings group.

Figure 2:
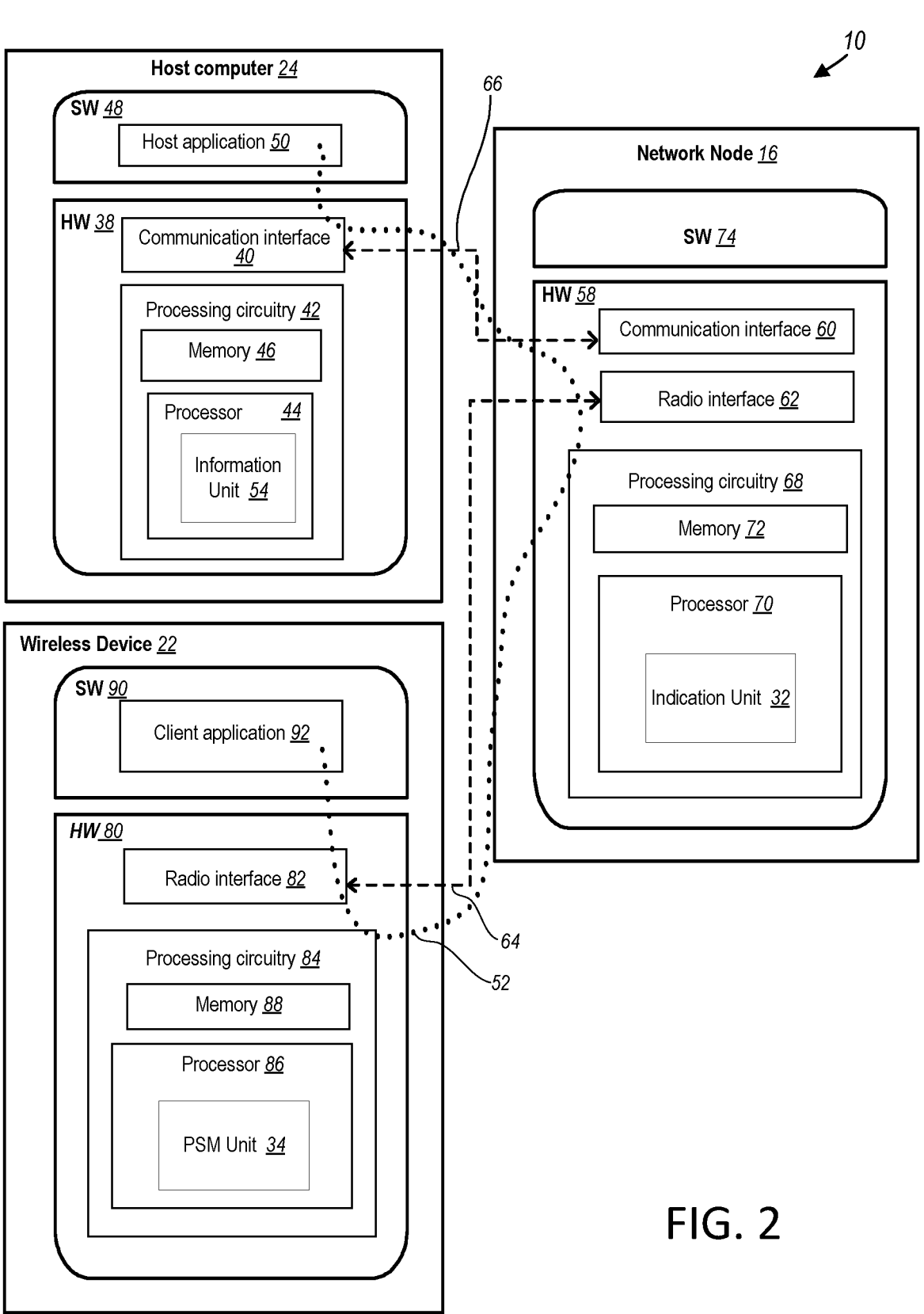
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as indication unit 32, and PSM unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
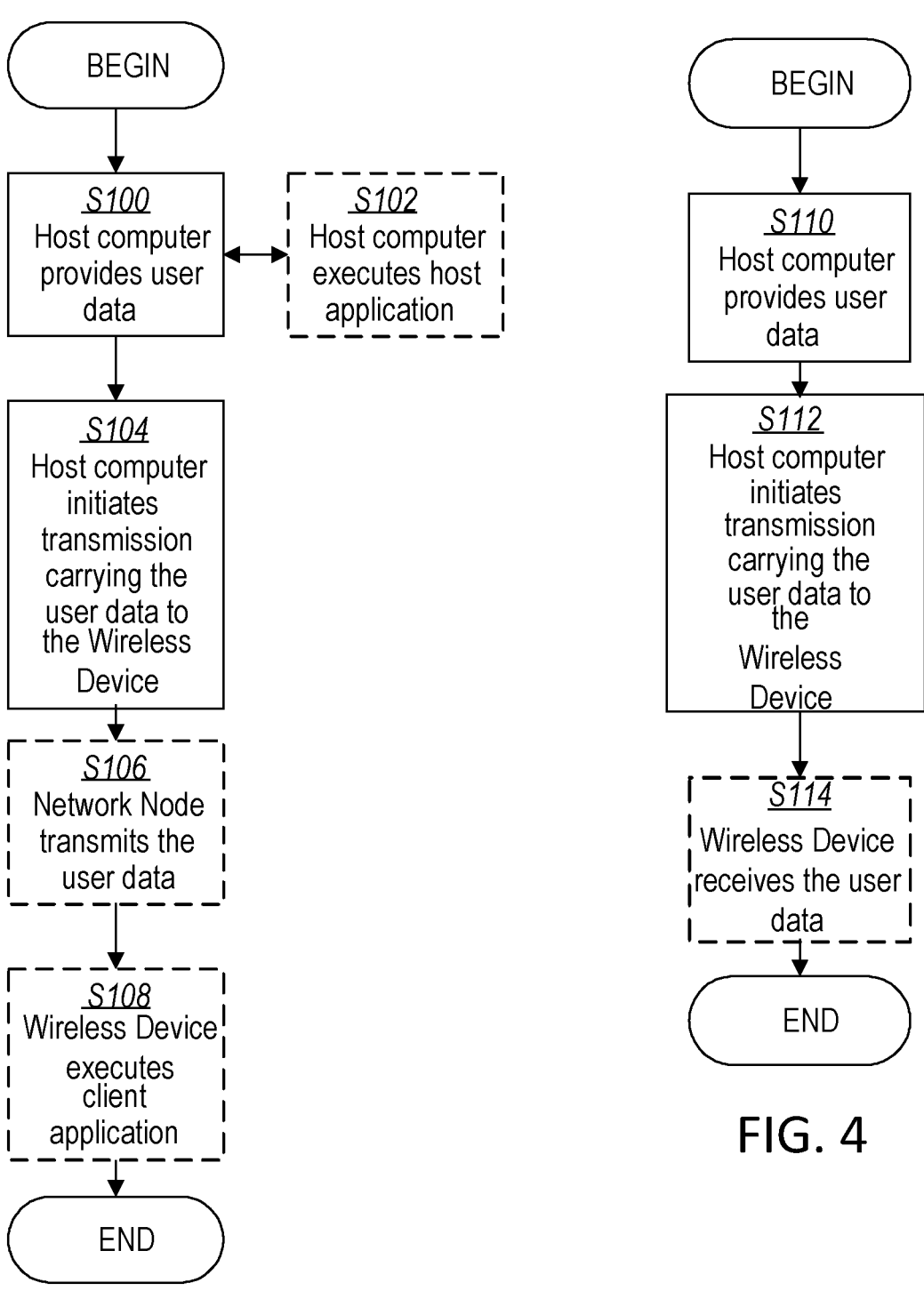
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
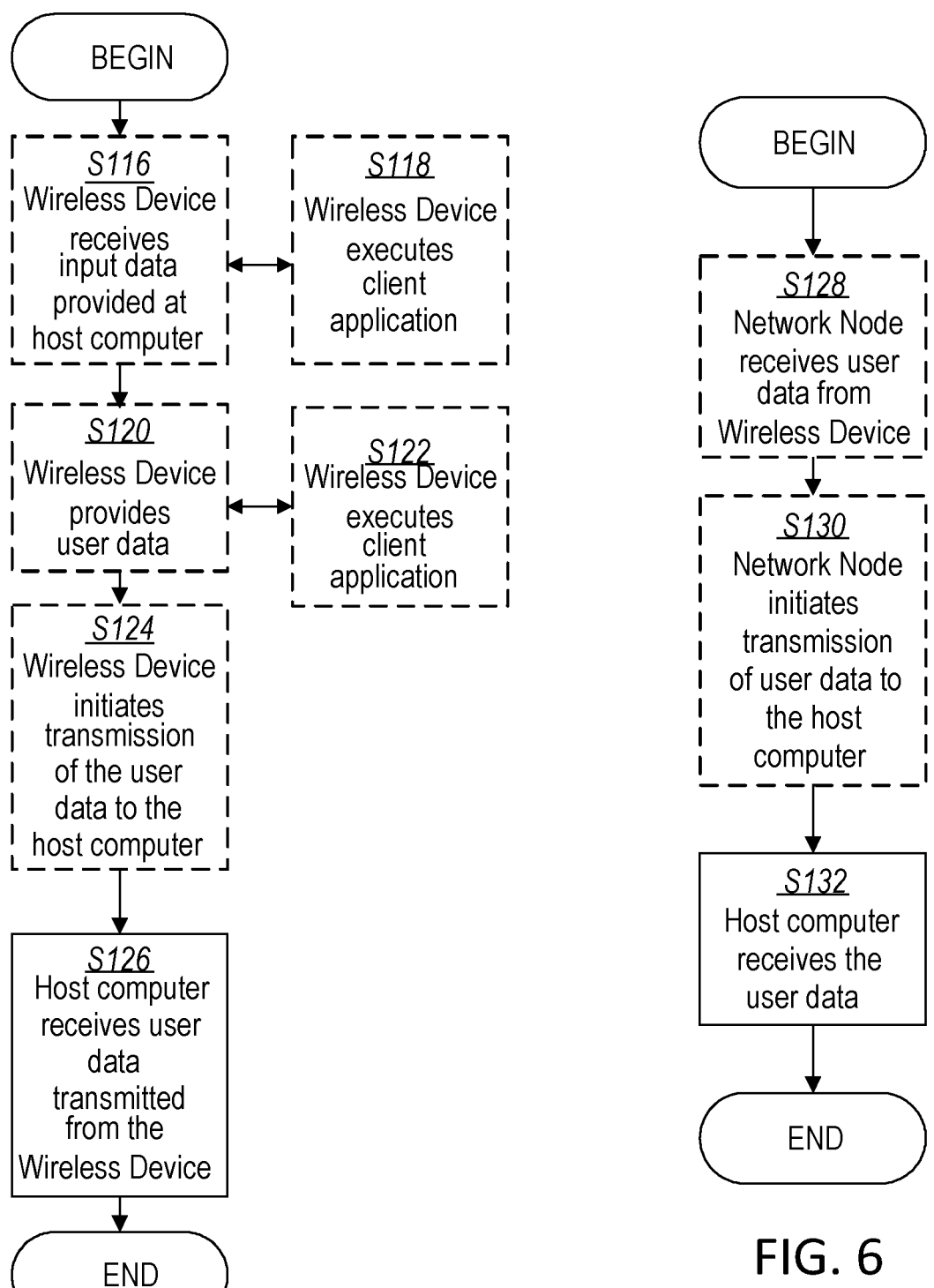
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 7 is a flowchart of an example process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 is configured to cause (Block S134) transmission of information indicating whether the wireless device 22 is to one of proceed and at least temporarily stop a power savings mode, at the wireless device 22, for at least one cell 18 in a power saving group where the information is based at least on whether a predefined criterion is met, as described herein.

According to one or more embodiments, the predefined criterion is associated with least one of wireless device speed, wireless device location in a cell 18, a radio condition between the wireless device 22 and a cell 18, cell changes, and a wake-up signal configuration. According to one or more embodiments, the processing circuitry 68 is further configured to determine the information based on at least one of measurements and wireless device provided information. According to one or more embodiments, the information relates to one of the at least one cell 18 in the power savings group and to a cell 18 in the power savings group different from the at least cell 18 in the power savings group.

FIG. 8 is a flowchart of another example process in a network node 16 according to some embodiments of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 is configured to configure (Block S136) at least a first criterion for the wireless device to use to enter a first mode for a plurality of serving cells 18 of a power savings group, PSG, based at least on the plurality of serving cells 18 meeting the at least first criterion, and revert to a second mode for a plurality of severing cells 18 of the PSG based at least on one severing cell 18 of the plurality of serving cells 18 failing to meet the at least a second criterion, the first mode being associated with a first measurement period greater than a second measurement period of the second mode, as described herein. Network node 16 is configured to transmit (Block S138) information to the wireless device 22 associated with one of the at least first criterion and the at least second criterion, as described herein.

According to one or more embodiments, the at least first criterion is based on at least one of: a speed of the wireless device 22, a location of the wireless device 22 in a serving cell 18, and a variation in a radio condition for the wireless device 22. According to one or more embodiments, the at least second criterion is met based one at least one of a speed of the wireless device 22, a location of the wireless device 22 in a serving cell 18, and a variation in a radio condition for the wireless device 22. According to one or more embodiments, the location of the wireless device 22 in the serving cell 18 is determined based on a signal measurement, the signal measurement indicating the wireless device 22 is in a predefined area of one of the serving cells 18.

According to one or more embodiments, the at least first criterion is met based on at least one of the speed of the wireless device being below a first threshold, a signal measurement of a serving cell 18 being above a second threshold, and a variation in signal measurements over a predefined time being below a third threshold. According to one or more embodiments, the signal measurement is based on the measurement of at least one of a path loss, reference signal received power, RSRP, reference signal received quality, RSRQ, signal to noise ratio, SNR, signal to inter-ference ratio, SINR, layer 1-RSRP, layer 1-SINR, and chan-nel quality indicator, CQI. According to one or more embodiments, the plurality of serving cells 18 are configured for intra-band carrier aggregation.

According to one or more embodiments, the plurality of serving cells 18 is associated with a first type of deployment scenario, the first type of deployment scenario being based on at least one of a physical location of each of the plurality of serving cells 18 with respect to each other, a relation between timings of the plurality serving cells 18, and a coverage area of each of the plurality of serving cells 18. According to one or more embodiments, the first mode corresponds to a power saving mode that is configured to consume less wireless device power than the second mode. According to one or more embodiments, the processing circuitry 68 is further configured to configure the at least second criterion for the wireless device to use.

FIG. 9 is a flowchart of an example process in a wireless device 22 according to some embodiments of the present disclosure. One or more Blocks and/or functions performed by wireless device 22 may be performed by one or more elements of wireless device 22 such as by PSM unit 34 in processing circuitry 84, processor 86, radio interface 82, etc. In one or more embodiments, wireless device 22 such as via one or more of processing circuitry 84, processor 86, PSM unit 34 and radio interface 82 is configured to one of proceed and stop (Block S140) a power savings mode, at the wireless device 22, for at least one cell 18 in a power saving group based at least on whether a predefined criterion is met, as described herein.

According to one or more embodiments, the processing circuitry 84 is further configured to one of: determine whether the predefined criterion is met; and receive infor-mation indicating whether the predefined criterion is met. According to one or more embodiments, the predefined criterion is associated with least one of wireless device speed, wireless device location in a cell 18, a radio condition between the wireless device 22 and a cell 18, cell changes, and a wake-up signal configuration. According to one or more embodiments, whether the predefined criterion is met corresponds to whether one of the at least one cell 18 in the power savings group and a cell 18 in the power savings group different from the at least cell 18 in the power savings group meets the predefined criterion.

FIG. 10 is a flowchart of another example process in a wireless device 22 according to some embodiments of the present disclosure. One or more Blocks and/or functions performed by wireless device 22 may be performed by one or more elements of wireless device 22 such as by PSM unit 34 in processing circuitry 84, processor 86, radio interface 82, etc. In one or more embodiments, wireless device 22 is configured to enter (Block S142) a first mode for a plurality of serving cells 18 of a power savings group, PSG, based at least on the plurality of serving cells 18 meeting at least a first criterion, as described herein. In one or more embodi-ments, wireless device 22 is configured to determine (Block S144) a first serving cell 18 of the plurality of serving cells 18 fail to meet at least a second criterion, as described herein.

In one or more embodiments, wireless device 22 is configured to revert (Block S146) to a second mode for the first serving cell 18 based on the determination that the first serving cell 18 fails to meet the at least second criterion, as described herein. In one or more embodiments, wireless device 22 is configured to revert (Block S148) to the second mode for the remaining serving cells 18 of the plurality of serving cells 18 based on the determination that the first serving cell 18 fails to meet the at least second criterion where the first mode is associated with a first measurement period greater than a second measurement period of the second mode, as described herein.

According to one or more embodiments, the at least first criterion is based on at least one of: a speed of the wireless device 22, a location of the wireless device 22 in a serving cell 18, and a variation in a radio condition for the wireless device 22. According to one or more embodiments, the at least second criterion is based on at least one of a speed of the wireless device 22, a location of the wireless device 22 in a serving cell 18; and a variation in a radio condition for the wireless device 22. According to one or more embodi-ments, the at least first criterion is met based one at least one of: the speed of the wireless device 22 being below a first threshold, a signal measurement of a serving cell 18 being above a second threshold, and a variation in signal mea-surements over a predefined time being below a third threshold. According to one or more embodiments, in the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

According to one or more embodiments, the location of the wireless device 22 in the serving cell 18 is determined based on a signal measurement where the signal measure-ment indicates the wireless device 22 is in a predefined area of one of the serving cells 18. According to one or more embodiments, the plurality of serving cells 18 is configured for intra-band carrier aggregation. According to one or more embodiments, the processing circuitry 84 is further config-ured to receive information to allow the wireless device 22 to trigger the entering of the first mode and trigger the reverting to the second mode. According to one or more embodiments, the information indicates the at least first criterion.

According to one or more embodiments, the plurality of serving cells 18 is associated with a first type of deployment scenario where the first type of deployment scenario is based on at least one of a physical location of each of the plurality of serving cells 18 with respect to each other, a relation between timings of the plurality serving cells 18, and a coverage area of each of the plurality of serving cells 18. According to one or more embodiments, the first mode corresponds to a power saving mode in which the wireless device 22 consumes less power than the second mode. According to one or more embodiments, the processing circuitry 84 is further configured to one of: evaluate the at least first criterion periodically, evaluate the at least first criterion based on at least one condition, and evaluate the at least first criterion based on a message received from the network node 16.

According to one or more embodiments, the processing circuitry 84 is further configured to one of: evaluate the at least second criterion periodically, evaluate the at least second criterion based on at least one condition, and evaluate the at least second criterion based on a message received from the network node 16. According to one or more embodiments, the at least one condition is based on one of: a variation in signals between the network node 16 and wireless device 22, a quantity of cells changes the wireless device has performed over a predefined time duration, a predefined change of wake-up signal configurations and a battery power threshold for the wireless device where the battery power threshold is one of configured by the network node 16 and autonomously determined by the wireless device 22.

Having generally described arrangements for a power saving mode implementation for at least one cell 18 in a power savings group, details for these arrangements, functions and processes are provided as follows, and which may be implemented by the network node 16, wireless device 22 and/or host computer 24. Embodiments provide a power saving mode implementation for at least one cell 18 in a power savings group.

One or more network node 16 functions described below may be performed by one or another of processing circuitry 68, processor 70, indication unit 32, radio interface 62, etc. One or more wireless device 22 functions described below may be performed by processing circuitry 84, processor 86, PSM unit 34, radio interface 82, etc.

One or more embodiments generally relate to:

A method of starting power saving mode (e.g., first mode) for cells 18 in a PSG; and/or A method of stopping power saving mode for cells 18 in a PSG.

Common Aspects of Some Embodiments

This section describes scenarios and aspects that are common to both general embodiment listed above.

The wireless device 22 is configured with at least one power saving cell groups (PSG) including at least N number of cells 18. The term power saving cell group may also be called one or more of power saving group, power conservation cell group, power conservation group etc.

For simplicity, the embodiments are described in detail assuming the wireless device 22 is configured with one PSG. However, the wireless device 22 may be configured with two or more PSGs each comprising same or different number of cells 18. The embodiments are therefore applicable for any number of PSGs with which the wireless device 22 can be configured. For example, the wireless device 22 can be configured with J number of power saving cell groups (PSG) denoted by set G (G=[G1, G2, G3, . . . Gr]) where each PSG, Gi, in set G may comprise Ni number of cells 18 in set C=[N1, N2, N3, . . . , N$_J$].

The wireless device 22 can be configured with one or more PSG according to one or more rules, which may also be referred to as one or more of mechanisms, principles, etc. Examples of PSG configuration rules are:

PSG is pre-defined,

The wireless device 22 is configured with the PSG by the network node 16, e.g., by receiving from the serving cell 18 a configuration message containing information about cells 18 in the PSG, Preconfigured in the wireless device 22, e.g., in the SIM or USIM card.

The wireless device 22 autonomously determines or creates the PSG. For example, the wireless device 22 may create the PSG dynamically, semi-statically or statically and transmit the information about the determined PSG to the network node 16. For example, the determination can be based on one or more rules. Examples of rules are: the wireless device 22 architecture such as cells 18 on carriers in the same band belongs to PSG, based on dynamically changing parameters (e.g., the wireless device 22 power consumption or wireless device 22 battery power level) etc. For example, if the wireless device 22 battery power falls below certain threshold then the wireless device 22 creates PSG including the number of cells 18 in PSG above certain threshold (e.g., 3); otherwise the wireless device 22 creates PSG including the number of cells 18 in a PSG below or equal to certain threshold.

Examples of Power Saving Cell Groups:

The rules for creating PSG are described with several examples below:

1. In one example, the PSG includes two or more cells belong to the same cell group, e.g., two or more cells 18 in master cell group (MCG), secondary cell group (SCG), etc.

2. In another example, the PSG includes two or more cells belonging to MuC operation or configuration, e.g., two or more cells 18 configured for CA, two or more cells 18 configured for DC, etc.

3. In another example, the PSG includes two or more cells 18 belonging to certain type of MuC operation or configuration. Examples of types of MuC includes intra-band MuC (e.g., when serving cells 18 belong to the same frequency band), inter-band MuC (e.g., when at least 2 serving cells 18 belong to different frequency bands), intra-band contiguous MuC (e.g., when serving cells 18 operate in adjacent carrier frequencies belonging to the same frequency band), intra-band non-contiguous MuC (e.g., when at least 2 serving cells 18 operate in non-adjacent carrier frequencies belonging to the same frequency band).

In one example, the PSG may include two or more cells 18 configured for intra-band CA.

In another example, PSG may include two or more cells 18 configured for intra-band DC.

In another example, PSG may include two or more cells 18 configured for intra-band non-contiguous CA etc.

4. In another example, the PSG includes two or more cells 18 belonging to certain type of deployment scenario or combination of two or more deployment scenarios. Examples of parameters related to the deployment type include one or more of: physical location of the cells 18 (e.g., antennas) with respect each other, relation between the timings of the cells 18, size of the cells 18, etc.

In one example cells 18 which are co-located in the same physical location or site are configured in the same PSG, i.e., all the signals belonging to the same PGC are transmitted from the same or closed antenna. These are also called as the co-located cells 18 or co-located sites.

In another example, cells 18 which are of the same or similar size (e.g., cell range or cell radius) are configured in the same PSG. In one specific example, two or more macro cells 18 are configured in one PSG, two or more micro cells 18 are configured in another PSG and two or more pico cells are configured in yet another PSG. The cell size of macro cell 18 is larger than that of the micro cell 18, whose cell size is in turn larger than that of the pico cell 18.

In another example, cells 18 whose received timings at the wireless device are within certain received time threshold (Hr) and/or whose transmit timings at the wireless device are within certain transmit time threshold (Ht) are configured in the same PSG. An example of a performance metric or parameter defining received timings of cells 18 at the wireless device 22 includes: maximum received timing difference (MRTD) between signals of a pair of cells 18 at the wireless device 22. An example of a performance metric or parameter defining transmit timings includes maximum transmission timing difference (MTTD) between signals of a pair of cells 18 transmitted by the wireless device 22. Examples of Hr and Ht are 30.26 µs and 32.47 µs, respectively.

5. In another example, the PSG includes two or more cells 18 which are within or belonging to certain frequency range (FR):

In one example, cells 18 whose carrier frequencies are within certain frequency threshold (Hf) are configured in the same PSG. Examples of Hf are 100 MHz, 1 GHz, etc.

In another example, cells 18 whose carrier frequencies belong to the same FR are configured in the same PSG. Examples of FR are FR1, FR2, FR3, FR4, etc. An example of FR1 includes frequencies which are between 400 MHz and 7 GHz. An example of FR2 includes frequencies which are between 24 GHz and 52.6 GHz. An example of FR3 includes frequencies which are above 52.6 GHz. An example of FR4 includes frequencies which are between 7 GHz to 24 GHz.

6. In another example, the PSG includes two or more cells 18 for which the wireless device 22 uses a common beam management (CBM) scheme for operating signals (e.g., beams in certain direction(s)) between the wireless device 22 and the cells 18. The operating of signals includes/corresponds to receiving signals from the cells and/or transmitting signals to the cells 18. For signal reception based on CBM scheme, the wireless device 22 can receive signals from the same Rx beam direction from all the cells 18 involved in the CBM. For signal transmission based on CBM scheme, the wireless device 22 can transmit signals in the same Tx beam direction in all the cells 18 involved in the CBM. The wireless device 22 supporting CBM typically has one or a common receiver for receiving beams from and/or common transmitter for transmitting beams to cells 18 involved in CBM. The wireless device 22 can indicate its capability that it supports CBM for cells 18 belonging to one or more bands.

7. In any of the examples above, in one example implementation, the PSG includes at least a reference cell (RC) 18 and one or more additional cells 18. The reference cell 18 can be pre-defined, configured by the network node 16 or determined by the wireless device

22 autonomously. In one example, the RC 18 can be a SpCell 18. In another example, the RC 18 can be a cell 18 with certain frequency, e.g., cell 18 with lowest frequency among all the cells 18 in the PSG.

Figure 11:
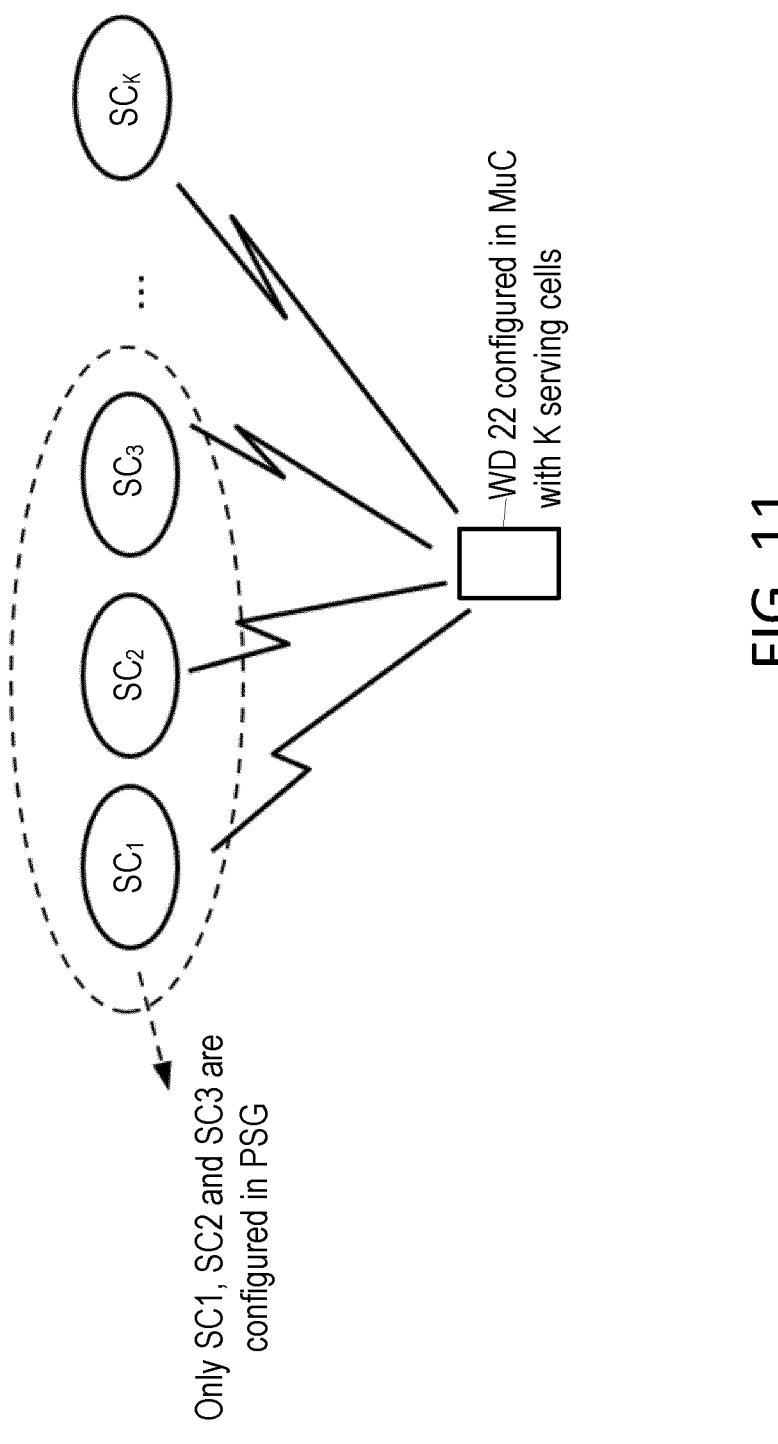
FIG. 11 is a diagram of an example of serving cells configured in PSG for a wireless device operating in MuC.

FIG. 11 is a diagram of an example of the concept of PSG, where the wireless device 22 is configured in MuC (e.g., CA) with K number of serving cells 18 (SCs), e.g., K=5. However, only three of the K serving cells 18 (e.g., SC1, SC2 and SC3) are configured in the PSG.

Example #1: Method of Starting Power Saving Mode for Cells in PSG

According to one or more embodiments, the wireless device 22 obtains information whether it is operating or is going to operate or is expected to operate one or more cells 18 belonging to PSG in a power saving mode (PSM):

> If the wireless device 22 obtains information that it is operating or is going to operate or is expected to operate at least L1 number of cells 18 belonging to the PSG in the PSM then the wireless device 22 is further allowed to operate up to M1 additional cells 18 belonging to that PSG in the PSM regardless of whether M1 cells 18 meet the criteria to operate in PSM or not; where (L1+M1)≤N.
>
> But if the wireless device 22 obtains information that it is not operating or is not going to operate or is not expected to operate at least L1 number of cells 18 belonging to the PSG in the PSM then the wireless device 22 does not operate any cell 18 of the PSG in the PSM that does not meet the criteria to operate in PSM; where (L1+M1)≤N.

The wireless device 22 may obtain or acquire information whether the wireless device 22 is operating or is going to operate or is expected to operate or will continue operate one or more cells 18 belonging to PSG in PSM, or not, based on a configuration message received from the network node 16 or based on a determination performed by the wireless device. For example, if the obtained information indicates that the wireless device 22 meets one or more criteria (described below) for a cell 18 then the wireless device 22 can operate that cell 18 in the PSM (e.g., enter a first mode for one or more cells 18); otherwise the wireless device cannot operate or cannot continue operating that cell 18 in the PSM (e.g., revert or remain in a second mode).

Examples of Criteria for Entering in PSM:

Examples of criteria for determining whether the wireless device 22 can operate in the PSM include one or more of:

Wireless device 22 speed: For example, the wireless device 22 is allowed to operate a cell 18 in PSM if the wireless device 22 meets low mobility criterion in that cell 18; otherwise the wireless device 22 is not allowed to operate that cell 18 in PSM. In one example, low mobility criterion is met when the wireless device 22 speed (V) is low. In one specific example, the wireless device 22 speed is low if V is below certain speed threshold (Vh) (e.g., low mobility criterion is met if V<Vh). The wireless device 22 speed can be expressed in terms of distance per unit time (e.g., Y1 km/hour) and/or in Doppler frequency (e.g., Y2 Hertz). In another example low mobility criterion is met when received signal level at the wireless device with respect to the cell 18 is static or quasi-static over certain time period (Ts). The received signal with respect to the cell 18 is static or quasi-static if it does not change by more than certain margin over certain time period, e.g., the variance of the measured signal levels is within a certain threshold.

Examples of received signal are signal strength, path loss, RSRP, L1-RSRP, L1-SINR, etc.

Wireless device 22 location in a cell 18. For example, the wireless device 22 is allowed to operate a cell 18 in PSM if the wireless device 22 meets not-at-cell edge criterion in that cell 18; otherwise the wireless device 22 is not allowed to operate that cell 18 in PSM. The not-at-cell edge criterion is met if the wireless device 22 is not at the cell edge; otherwise not-at-cell edge criterion is not met. In one example, the determination whether not-at-cell edge criterion is met or not is based on signal measurement with respect to the cell 18. For example, the wireless device meets not-at-cell edge criterion provided that the signal measurement value with respect to the cell 18 is above certain threshold; otherwise the wireless device 22 does not meet the not-at-cell edge criterion. Examples of signal measurements are signal strength, path loss, RSRP, RSRQ, SNR, SINR, L1-RSRP, L1-SINR, CQI, etc.

Wireless device 22 speed and wireless device 22 location in a cell 18. For example, the wireless device 22 is allowed to operate a cell 18 in PSM if the wireless device 22 meets both low mobility criterion and not-at-cell edge criterion in that cell 18; otherwise the wireless device 22 is not allowed to operate that cell 18 in PSM.

Variation in radio condition: For example, the wireless device 22 is allowed to operate a cell 18 in PSM if the variation in the radio conditions for the wireless device 22 in that cell 18 do not change by more than certain margin over certain time; otherwise the wireless device 22 is not allowed to operate that cell 18 in PSM. The variation in the radio conditions can be determined by estimating the variation of the signal between the wireless device 22 and that cell 18. Examples of parameters which can depict signal variation are multi-path delay spread, measured signal value, Doppler frequency, etc. Examples of measured signal value are signal strength, signal quality, etc. For example, if the change in the Doppler frequency (Df) is less than or equal to Z1 Hertz over Tv time period then the wireless device 22 is allowed to operate the cell 18 in the PSM; otherwise (i.e., if Df>Z1 over Tv) the wireless device 22 is not allowed to operate that cell 18 in PSM. On top of that, if the change in the delay spread (Ds) is less than or equal to Z2 nanoseconds (ns) over Ts time period in a cell 18 (i.e., if Df<=Z1 and Ds<=Z2 over Ts) then the wireless device 22 is allowed to perform RLPs in relaxed mode in that cell 18; otherwise (i.e., if Df>Z1 or Ds>Z2 over Tv) the wireless device 22 is not allowed to perform RLPs in relaxed mode in that cell 18.

Cell changes: Whether the wireless device 22 is allowed to operate a cell 18 in PSM may depend on the number of cell changes (N1) the wireless device 22 has performed over the last T1 duration, where N1 and T1 can have configurable or predefined values.

Certain types of wake-up signal configuration: The wake up signal (WUS) can have different mappings. One type of mapping is 1×1, which means there is a WUS signal transmitted prior to every paging or DRX ON if WUS is configured. This means in the beginning of every DRX ON duration the wireless device 22 attempts to receive the WUS signal and, based on the information conveyed in the WUS, the wireless device 22 remains awake and receives the control channel or it may go to sleep. Another type of mapping is 1×N, in this case one WUS signal is related to multiple POs or DRX ON durations. Certain type of WUS configurations can be used by the wireless device 22 for determining whether to enter PSM mode. In one specific example, the wireless device 22 can enter the PSM mode for WUS configuration 1×N, where N≥2.

The determination based on one or more of the above criteria can be performed by the wireless device 22 or by the network node 16, as elaborated below:

Wireless Device 22 Based Determination:

In one example, the wireless device 22 performs the determination whether it meets one or more criteria (described above) for operating a cell 18 in a power saving mode (PSM), e.g., a first mode. For each cell 18, the criteria are evaluated separately or independently. The wireless device 22 may further be configured by the network node 16 with the criteria to be used for the determination, and/or whether the wireless device 22 can operate a certain cell 18 in the PSM if the wireless device 22 meets the criteria for PSM. The wireless device 22 determines based on one or more rules, e.g., The wireless device 22 evaluates the one or more criteria periodically, e.g., the wireless device 22 evaluates the criteria once every T1 time period. T1 can be predefined, configured by the network node 16 or is up to wireless device 22 implementation.

The wireless device 22 evaluates the one or more criteria upon triggering one or more conditions, which can be pre-defined, configured by the network node 16 or autonomously determined by the wireless device, e.g., when the wireless device 22 battery power falls below certain threshold.

The wireless device 22 evaluates the one or more criteria upon receiving a message from the network node 16, e.g., message allowing the wireless device 22 to relax one or more requirements to enable wireless device 22 power saving.

Network Node 16 Based Determination:

In one or more embodiments, the network node 16 determines whether the wireless device 22 meets the criteria for operating the cell 18 in PSM, e.g., the wireless device 22 speed is below threshold, the wireless device 22 is not in cell edge, both wireless device 22 speed is low and the wireless device 22 is not in cell edge, etc. For example, the network node 16 may use one or more measurements performed by the wireless device 22 and/or by the network node 16 on signals operating between the wireless device 22 and a cell 18, to determine whether the wireless device 22 meets the criteria for operating that cell 18 in PSM or not. The network node 16 then configures the wireless device 22 with an indicator or configuration message informing the wireless device 22 whether the criteria is met or not for operating certain cell 18 in the PSM. Therefore, the wireless device 22 receives a message from the network node 16 that indicates or configures or informs the wireless device 22 whether the wireless device 22 is meeting one or more criteria for operating one or more cells 18 in PSM or not. This may be elaborated upon using the following examples:

As an example, the indication or the configuration message includes, for example, YES or NO, 0 or 1, ON or OFF, Enable or Disable, etc. The message may further include additional information related to the cell 18 (e.g., cell identifier (e.g., PCI, CGI, carrier frequency information (e.g., NR-ARFCN, GSCN, channel number, etc.)) where PSM can be applied or not, type of RLP which can be operated in PSM or not, etc. In one example, the indicator, YES (0, ON, or Enable), means the wireless device 22 is meeting the criteria for operating a cell 18 in PSM, and NO (1, OFF, or Disable) means the wireless device 22 is not meeting (or not meeting any more) the criteria for operating the cell 18 in PSM. The indication, YES (0, ON, or Enable), allows the wireless device 22 to operate the cell 18 in the PSM, e.g., apply one or more RLPs meeting relaxed requirements. The indication, NO (1, OFF, or Disable), forbids the wireless device 22 to operate the cell 18 in the PSM or stops the wireless device 22 from operating the cell 18 in the PSM (if the cell 18 is being operated in PSM), e.g., apply one or more RLPs meeting normal (legacy) requirements.

The above method is described with few examples below:

In one example: N=2 and L1=M1=1, e.g., PSG includes a SpCell and SCell. In this case, for example, if the criteria to operate SpCell in PSM is met then the wireless device 22 is allowed to operate the SCell also in the PSM for at least operating one or more RLPs.

In another example: N=3, L1=1 and M1=2, e.g., PSG includes a SpCell and two SCells. In this case, for example, if the criteria to operate SpCell in PSM is met then the wireless device 22 is allowed to operate both SCells (SCell1 and SCell2) also in the PSM.

In another example: N=4, L1=2 and M1=2, e.g., PSG includes a SpCell and three SCells (SCell1, SCell2 and SCell3). In this case, in one example, if the criteria to operate both SpCell and SCell1 in PSM is met then the wireless device 22 is also allowed to operate the other two SCells (SCell2 and SCell3) also in the PSM. In another example, if the criteria to operate only SpCell in PSM is met then the wireless device is not allowed to operate any other SCell in the PSM, i.e., none of three SCells (SCell1, SCell2 and SCell3) is allowed to be operated by the wireless device 22 in the PSM.

In another example: N=3, L1=1 and M1=2, e.g., PSG includes a SpCell and 2 SCells. In this example, SpCell is a reference cell. In this case only if the criteria to operate SpCell (reference cell) in PSM is met then the wireless device 22 is also allowed to operate the two SCells (SCell1 and SCell2) also in the PSM; otherwise the wireless device 22 is not allowed to operate the two SCells in PSM. In another example, if the criteria to operate one of the SCells (e.g., SCell1) in PSM is met then the wireless device 22 is only allowed to operate this SCell (SCell1) in PSM but not the other cells (SpCell and SCell2). In another example, if the criteria to operate the two SCells (e.g., SCell 1 and SCell2) in PSM are met for both the SCells then the wireless device 22 is allowed to operate the two SCells in PSM but not the SpCell (because SpCell has not met the criteria for PSM).

In yet another example: N=3, L1=1 and M1=2, e.g., PSG includes a SpCell and two SCells. In this example, it is assumed that the criteria for operating in PSM mode are different for different RLPs. In this case, for example, if the criteria to operate SpCell in PSM is met for one type of RLP, but not for the others, then the wireless device 22 is allowed to operate both SCells (SCell 1 and SCell2) also in the PSM for that type of RLP but not for others.

In yet another example: N=3, L1=1 and M1=2, e.g., PSG includes a SpCell and two SCells. In this example, it is assumed that the criteria for operating in PSM mode are different for different RLPs. In this case, for example, if the criteria to operate SpCell in PSM is met for two types of RLPs, then the wireless device 22 can be allowed to operate both SCells (SCell 1 and SCell2) in the PSM for only one type of RLP but not for the second type.

The one or more parameters N, L1 and M1 related to PSG can be obtained by the wireless device 22 based on one or more of the following principles:

pre-defined;

configured by the network node; and determined by the wireless device 22 autonomously. In this case, the wireless device 22 also informs the network node 16 about the determination.

Examples of Wireless Device 22 Behavior in Power Saving Mode:

When operating a cell 18 in PSM, the wireless device 22 performs one or more RLPs in relaxed mode or relaxed operational mode. The term operating the cell 18 may include, for example, transmitting signals and/or receiving signals between the wireless device 22 and that cell 18. In the relaxed mode, the wireless device 22 meets one or more relaxed requirements associated with one or more radio link procedures (RLPs) used in that cell 18. A relaxed requirement for a certain RLP is the one that is relaxed compared to a certain reference requirement for the same RLP. In one specific example reference requirement is applicable for the RLP when the wireless device 22 operates the cell 18 in a normal mode or normal operational mode. As an example, the assumed requirement is a measurement time (Tos) (e.g., OOS evaluation period in RLM) for certain RLP (e.g., OOS detection in RLM). In one example, the relaxed requirement or relaxing the requirement includes extending the measurement time (Tos) with respect to the reference measurement time (Tos_r) by certain margin. In one specific example, Tos=ml\*Tos r; where ml>1 is scaling factor. For example, Tos_r is the requirement to be met by the wireless device 22 for performing the RLP (e.g., OOS detection in RLM) in the normal mode. In another example, assume that the measurement time (Tbfd) (e.g., BFD period) for certain RLP (e.g., BFD detection in beam management or link recover procedure). In one example, the relaxed requirement or relaxing the requirement includes extending the Tbfd with respect to the reference measurement time (Tbfd_r) by certain margin. In one example, Tbfd=m2\*Tbdf r; where m2>1 is scaling factor. For example, Tbfd_r is the requirement to be met by the wireless device 22 for performing the RLP (e.g., BFD detection in BM) in the normal mode.

Example #2: Method of Stopping Power Saving Mode for Cells 18 in PSG

According to one or more embodiments, if the wireless devices 22 obtains information that it is unable to operate or is unable to continue operating in a power saving mode (PSM) in at least L2 number of cells 18 belonging to PSG then the wireless device 22 is not allowed to operate in PSM in at least M2 additional cells 18 belonging to the PSG; where (L2+M2)≤N. IN one embodiment, N=2 and L2=M2=1. This is described with respect to the following examples:

In one example, if the wireless device 22 currently operating two or more cells 18 in PSG in PSM has to switch (e.g., revert) to operate at least one of the cells 18 in PSG in normal mode then the wireless device 22 also switches (e.g., reverts) to the normal mode of operation for the remaining cells 18 in PSG. For example, if the wireless device 22 is scheduled to receive and/or transmit signals in a cell 18 belonging to a PSG then the wireless device 22 may have to monitor the signals in that cell 18 on regular basis (e.g., every K1 resources, in every slot or every $4^{th}$ slot, etc.). This may require the wireless device 22 to operate in normal mode in that cell 18. Therefore, in this case, the wireless device 22 also switches to the normal operation in the remaining cells 18 in the PSG.

In another example, assume that the PSG includes a reference cell 18 (RC) 18 and 2 more cells 18, i.e., N=3.

If the wireless device 22 currently operating all the 3 cells in PSG in PSM has to switch (e.g., revert) to operate the RC in normal mode then the wireless device 22 also switches (e.g., reverts) to the normal mode of operation for the other two cells 18. On the other hand, if the wireless device has to switch any cell 18 other than the RC to the normal mode of operation then the wireless device 22 can still operate the other cells 18 including the RC in PSM. As an example, assume the RC is SpCell. In this case, if the wireless device 22 currently operating all the 3 cells 18 in a PSG in PSM has to switch to operate the RC (SpCell) in normal mode then the wireless device 22 also switches to the normal mode of operation for the two SCells 18 (SCell 1 and SCell2). But the not vice versa, i.e., wireless device 22 does not necessarily have to switch the operating mode of RC (from PSM to normal mode) if any of the SCells have switched its operating mode.

The wireless device 22 obtains information that it is unable to operate or cannot operate anymore certain cell 18 in PSM based on receiving a message from the network node 16 or by making the determination itself (e.g., wireless device 22 determines that it does not meet any criterion for operating that cell 18 in the PSM) as described in Example 1 above. The criteria for operating a cell 18 in the PSM are described in Example 1 above.

The one or more parameters L2 and M2 related to PSG can be obtained by the wireless device 22 based on one or more of the following:

pre-defined;

configured by the network node; and determined by the wireless device 22 autonomously. In this case, the wireless device 22 also informs the network node 16 about the determination.

As special case, L1=L2 and M1=M2.

Some additional non-limiting embodiments may include one or more of the following: Proposals on power saving techniques for radio link monitoring and beam management for 3GPP Release 17 work item on wireless device 22 power saving enhancements for NR has been approved where this new work item contains following objective which is likely to have RAN4 RRM impact:

1. Study and specify, if agreed, enhancements on power saving techniques for connected-mode wireless device 22, subject to minimized system performance impact [RAN1, RAN4]

a) Study the feasibility and performance impact of relaxing wireless device 22 measurements for RLM and/or BFD, particularly for low mobility wireless device 22 with short DRX periodicity/cycle, and specify, if agreed, relaxation in the corresponding requirements [RAN4] NOTE: Supplementary RAN2 work, if needed, can be triggered by RAN4 LS.

In response to the work item, power saving techniques for wireless devices 22 in radio link monitoring (RLM) and beam management (BM) procedures from an RRM perspective as discussed/proposed.

In particular, the work item objective states that relaxing of wireless device 22 measurements for RLM applies particularly for low mobility wireless devices 22 with short DRX periodicity/cycle. The RAN4 work can be divided into several parts as follows:

1. Scenario/criteria under which relaxed RLM and BM can be performed;

2. RLM and BM degradation during relaxation; and

3. Relaxed requirements for RLM and BM.

1. Scenario/Criteria for Applying Relaxed RLM/BM (e.g., First Mode)

One question that RAN4 needs to first discuss is the (low mobility) criteria for allowing the wireless device 22 to operate the relaxed RLM and BM procedures. The criteria should be defined such that it targets low mobility wireless devices 22 configured with short DRX cycles and such that there is no or minimum degradation to the corresponding legacy RLM and BM performance.

RLM and BM are performed in RRC CONNECTED state. Therefore, low mobility criteria can be evaluated by the wireless device 22 or the network/network node 16. In the latter case, the network/network node 16 determines whether the wireless device 22 meets the low mobility criteria and configures the wireless device 22 whether it can operate RLM/BM in a relaxed mode. In some cases, the wireless device 22 can be allowed to relax both RLM and BM procedures, but in others only one of the procedures can be allowed to be relaxed. Upon receiving the configuration from the network/network node 16, the wireless device 22 starts performing the RLM/BM in a relaxed mode. On the other hand if the low mobility criteria are evaluated by the wireless device 22, the relaxation criteria needs to be specified and the wireless device 22 may be allowed to relax RLM/BM only if it meets the specified relaxation criteria, which may be different for RLM and BM.

In release 16 (3GPP Rel. 16) IDLE/INACTIVE states, one of the scenarios in which relaxed neighbor cell measurement requirements were applied was for low mobility wireless devices 22 and the wireless device 22 evaluates the criteria. The low mobility criteria were based on variation in signal strength measurements (SrxLev). However, this method may not be adequate for RLM/BM relaxation because they are critical features in RRC CONNECTED state. In order to secure acceptable RLM/BM performance under relaxation and to ensure that the relaxation is applied only when the radio link quality is good and reliable.

Therefore, RAN4 needs to first discuss and agree on the following question: whether to define Network (NW)/network node 16 based, wireless device 22 based criteria or a combination of NW and wireless device 22-based criteria for determining the low-mobility scenario where the wireless device 22 is allowed to operate RLM/BM in relaxed mode. In the combined approach some aspects of the criteria can be pre-defined while parameter values can be configured by the network/network node 16.

Proposal #1 in according with the present disclosure: RAN4 to discuss and agree on one of the following options:

Option 1: Low mobility scenario under which the wireless device 22 is allowed to relax the RLM/BM requirements is determined by the network/network node 16.

Option 2: Low mobility scenario under which the wireless device 22 is allowed to relax the RLM/BM requirements is determined by the wireless device 22.

Option 3: Low mobility scenario under which the wireless device 22 is allowed to relax the RLM/BM requirements is determined by both the network/network node 16 and wireless device 22.

2. RLM and BM degradation during relaxation

The wireless device 22 may start experiencing RLM performance degradation after the wireless device 22 has entered in the relaxed RLM mode after passing the relaxation criteria. For example, the wireless device 22 may detect out-of-sync and may even trigger a T310 timer. In this situation, the wireless device 22 may assess the radio link quality over shorter time for enabling the wireless device 22 to detect possible in-sync before the T310 expires. Therefore, when certain number of OOS are detected or at least when T310 is running the wireless device 22 may revert to the RLM with normal mode (legacy operation, e.g., second mode).

Similarly, the wireless device 22 may start detecting beam failure after the wireless device 22 has entered in the relaxed BM mode after passing the relaxation criteria. Upon beam failure detection, the wireless device 22 should quickly search for new candidate beams and report them to the network/network node 16. Therefore, upon detecting the beam failure the wireless device 22 may not be allowed to continue performing BM with relaxation and instead revert to the legacy BM operation.

> Proposal #2 in accordance with the present disclosure: The wireless device 22 while performing relaxed RLM upon detecting certain number of out-of-sync indications or upon triggering T310 reverts to the normal RLM operation (i.e., without relaxation).
>
> Proposal #3 in according with the present disclosure: The wireless device 22 while performing relaxed BM upon beam failure detection reverts to the normal BM operation (i.e., without relaxation).

3. Relaxed Requirements for RLM/BM

The second part of the expected RAN4 work concerns how to determine the relaxed requirements for RLM and BM. There are different alternatives which include: extending the RLM/BM evaluation period, extending the RLM (in-sync, out-of-sync) indication interval, extending the BM indication interval, relaxing the L1-RSRP measurement accuracy, relaxing the RLM-RS resources (fewer RLM-RS configurations), etc. RAN4 needs to discuss these alternatives further. In release 16, wireless device 22 power saving work, the legacy/normal requirements were relaxed using a scaling factor. The scaling factor can be predefined or signaled by the network/network node 16. According to the present disclosure, a similar approach can be adopted for defining the relaxed RLM/BM. For example, the legacy evaluation period and the indication intervals can be relaxed by a scaling factor, e.g. K=2 or K=4. K can be predefined or signaled, and needs more discussions.

BM is used in both PCell and SCell in CA or PSCell and SCell in NR-DC. In intra-band CA or DC, the wireless device 22 typically has common RF front end for SpCell and SCell(s). In intra-band CA/DC if the BM relaxation criteria is met only for one serving cell then, whether the BM relaxation is also allowed on other serving cells needs further investigation both from wireless device 22 power saving and network performance perspective.

> Proposal #4 in according with the present disclosure: RAN4 to further discuss use of a scaling factor for defining the relaxed RLM/BM evaluation period and indication intervals.
>
> Proposal #5 in according with the present disclosure: RAN4 to further discuss the relaxation of BM when not all serving cells 18 in intra-band CA/DC meets relaxation criteria.

Relaxed RLM/BM requirements imply that the wireless device 22 performs measurements on reference signals (e.g., SSB, CSI-RS) more infrequently compared to the measurements performed in legacy RLM/BM. For example, under relaxation the wireless device 22 may only need to measure 4 times less often during the evaluation period than it has to measure for the same procedure in in the normal (legacy) normal mode. In the normal mode (e.g., second mode), the wireless device 22 can be configured to monitor the PDCCH for, e.g., DL data scheduling and UL grant, as often as in every resource in every slot, or during the ON duration of the DRX cycle (if DRX is configured). However, there may be no or minimal power saving if the wireless device 22 monitors PDCCH as in legacy when performing the RLM/BM in relaxed mode (e.g., first mode). Hence, RAN4 needs to discuss the impact of RLM/BM relaxation on PDCCH monitoring. For example, wireless device 22 may need to monitor also the PDCCH for wireless device 22 specific search space in relax mode (e.g., less frequently) if wireless device 22 is operating RLM/BM in the relaxed mode.

> Proposal #6 in according with the present disclosure: RAN4 to discuss the impact of RLM/BM relaxation on PDCCH monitoring.

Hence, one or more notions have been discussed on relaxed radio link monitoring and beam management requirements. Based on the discussions, the following proposals in accordance with the teachings of the present disclosure have been made:

> Proposal #1: RAN4 to discuss and agree on one of the following options (which are based on one or more embodiments of the present disclosure):
>> Option 1: Low mobility scenario under which the wireless device 22 is allowed to relax the RLM/BM requirements is determined by the network/network node 16.
>> Option 2: Low mobility scenario under which the wireless device 22 is allowed to relax the RLM/BM requirements is determined by the wireless device 22.
>> Option 3: Low mobility scenario under which the wireless device 22 is allowed to relax the RLM/BM requirements is determined by both the network/network node 16 and wireless device 22.
>
> Proposal #2: The wireless device 22 while performing relaxed RLM upon detecting certain number of out-of-sync indications or upon triggering T310 reverts to the normal RLM operation (i.e., without relaxation).
>
> Proposal #3: The wireless device 22 while performing relaxed BM upon beam failure detection reverts to the normal BM operation (i.e., without relaxation).
>
> Proposal #4: RAN4 to further discuss use of a scaling factor for defining the relaxed RLM/BM evaluation period and indication intervals.
>
> Proposal #5: RAN4 to further discuss the relaxation of BM when not all serving cells 18 in intra-band CA/DC meets relaxation criteria.
>
> Proposal #6: RAN4 to discuss the impact of RLM/BM relaxation on PDCCH monitoring.

Some Additional Examples

Example A1. A network node 16 configured to communicate with a wireless device 22 (WD 22), the network node 16 configured to, and/or comprising a radio interface 62 and/or comprising processing circuitry 68 configured to:
> cause transmission of information indicating whether the wireless device 22 is to one of proceed and at least temporarily stop a power savings mode, at the wireless device 22, for at least one cell 18 in a power saving group, the information being based at least on whether a predefined criterion is met.

Example A2. The network node 16 of Example A1, wherein the predefined criterion is associated with at least one of wireless device speed, wireless device location in a cell 18, a radio condition between the wireless device and a cell 18, cell changes, and a wake-up signal configuration.

Example A3. The network node 16 of any one of Examples A1-A2, wherein the processing circuitry 68 is further configured to determine the information based on at least one of measurements and wireless device 22 provided information.

Example A4. The network node 16 of any one of Examples A1-A3, wherein the information relates to one of the at least one cell 18 in the power savings group and to a cell 18 in the power savings group different from the at least cell 18 in the power savings group.

Example B1. A method implemented in a network node 16, the method comprising causing transmission of information indicating whether a wireless device 22 is to one of proceed and at least temporarily stop a power savings mode, at the wireless device 22, for at least one cell 18 in a power saving group, the information being based at least on whether a predefined criterion is met.

Example B2. The method of Example B1, wherein the predefined criterion is associated with least one of wireless device speed, wireless device location in a cell, a radio condition between the wireless device 22 and a cell 18, cell changes, and a wake-up signal configuration.

Example B3. The method of any one of Examples B1-B2, further comprising determining the information based on at least one of measurements and wireless device 22 provided information.

Example B4. The method of any one of Examples B1-B3, wherein the information relates to one of the at least one cell 18 in the power savings group and to a cell 18 in the power savings group different from the at least cell 18 in the power savings group.

Example C1. A wireless device 22 (WD 22) configured to communicate with a network node 16, the WD 22 configured to, and/or comprising a radio interface 62 and/or processing circuitry 68 configured to:

one of proceed and stop a power savings mode, at the wireless device, for at least one cell 18 in a power saving group based at least on whether a predefined criterion is met.

Example C2. The WD 22 of Example C1, wherein the processing circuitry 68 is further configured to one of:

determine whether the predefined criterion is met; and receive information indicating whether the predefined criterion is met.

Example C3. The WD 22 of any one of Examples C1-C2, wherein the predefined criterion is associated with least one of wireless device speed, wireless device location in a cell 18, a radio condition between the wireless device and a cell 18, cell changes, and a wake-up signal configuration.

Example C4. The wireless device 22 of any one of Examples C1-C3, wherein whether the predefined criterion is met corresponds to whether one of the at least one cell 18 in the power savings group and a cell 18 in the power savings group different from the at least cell 18 in the power savings group meets the predefined criterion.

Example D1. A method implemented in a wireless device 22 (WD 22), the method comprising one of proceeding and at least temporarily stopping a power savings mode, at the wireless device 22, for at least one cell 18 in a power saving group based at least on whether a predefined criterion is met.

Example D2. The method of Example D1, further comprising:

determining whether the predefined criterion is met; and receiving information indicating whether the predefined criterion is met.

Example D3. The method of any one of Examples D1-D2, wherein the predefined criterion is associated with least one of wireless device speed, wireless device location in a cell 18, a radio condition between the wireless device and a cell 18, cell changes, and a wake-up signal configuration.

Example D4. The method of any one of Examples D1-D3, wherein whether the predefined criterion is met corresponds to whether one of the at least one cell 18 in the power savings group and a cell 18 in the power savings group different from the at least cell 18 in the power savings group meets the predefined criterion.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation
ARFCN Absolute radio frequency channel number
BFD Beam failure detection
BM Beam management
BS Base station
CBD Candidate beam detection
CE Control element
CGI Cell global ID
CMP Channel monitoring pattern
CORESET Control resource set
CRS Cell-specific reference signals
CSI Channel state information
CSI-RS Channel state information reference signals
DC Dual connectivity
DCI Downlink control information
DL Downlink
FDD Frequency division duplex
FR1 Frequency range 1
FR2 Frequency range 2
GSCN Global synchronization channel number
gNB Next generation Node B
HARQ Hybrid automatic repeat request
IS In-sync
LTE Long term evolution
MAC Medium access control
MC Multi-carrier
MuC Multi-connectivity
NR New radio
OOS Out-of-sync
PBCH Physical broadcast channel
PCI Physical cell ID
PDCCH Physical downlink control channel
PDSCH Physical downlink shared channel
PSS Primary synchronization signal PSG Power saving cell group
PUCCH Physical uplink control channel
PUSCH Physical uplink shared channel
RACH Random access channel
RAT Radio access technology
RLM Radio link monitoring
RLP Radio link procedure
RRC Radio resource control
RSRP Received signal reference power
RSRQ Received signal reference quality
SCH Shared channel
SNR Signal to noise ratio
SRS Sounding reference signal
SS-RSRP Secondary synchronization RSRP
SS-RSRQ Secondary synchronization RSRQ
SSS Secondary synchronization signal
TCI Transmission configuration indicator It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to communicate with a network node, the wireless device comprising:
    processing circuitry configured to:
        enter a first mode of a Radio Link Procedure, RLP, for a plurality of serving cells of a power savings group, PSG, based at least on the plurality of serving cells meeting at least a first criterion, the at least first criterion being met based on one or more layer-1 signal measurements;
        determine a first serving cell of the plurality of serving cells fail to meet at least a second criterion;
        revert to a second mode of the RLP for the first serving cell based on the determination that the first serving cell fails to meet the at least second criterion; and
        revert to the second mode for the remaining serving cells of the plurality of serving cells based on the determination that the first serving cell fails to meet the at least second criterion; and
        the first mode being associated with a first measurement period greater than a second measurement period of the second mode.

2. The wireless device of claim 1, wherein the at least first criterion is based on at least one of:
    a speed of the wireless device;
    a location of the wireless device in a serving cell; and
    a variation in a radio condition for the wireless device.

3. The wireless device of claim 2, wherein the at least first criterion is met based one at least one of:
    the speed of the wireless device being below a first threshold;
    a signal measurement of a serving cell being above a second threshold; and
    a variation in signal measurements over a predefined time being below a third threshold.

4. The wireless device of claim 3, wherein the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

5. The wireless device of claim 1, wherein the plurality of serving cells is configured for intra-band carrier aggregation.

6. A network node configured to communicate with a wireless device, the network node comprising:

processing circuitry configured to:

configure:

at least a first criterion for the wireless device to use, the at least first criterion configured to cause the wireless device to enter a first mode of a Radio Link Procedure, RLP, for a plurality of serving cells of a power savings group, PSG, based at least on the plurality of serving cells meeting the at least first criterion, the at least first criterion being met based on one or more layer-1 measurements; and at least a second criterion for the wireless device to use, the at least second criterion configured to cause the wireless device to revert to a second mode of the RLP for a plurality of severing cells of the PSG based at least on one severing cell of the plurality of serving cells failing to meet the at least a second criterion, the first mode being associated with a first measurement period greater than a second measurement period of the second mode; and transmit information to the wireless device associated with one of the at least first criterion and the at least second criterion.

7. The network node of claim 6, wherein the at least first criterion is based on at least one of:

a speed of the wireless device;

a location of the wireless device in a serving cell; and a variation in a radio condition for the wireless device.

8. The network node of claim 6, wherein the at least first criterion is met based on at least one of:

the speed of the wireless device being below a first threshold;

a signal measurement of a serving cell being above a second threshold; and a variation in signal measurements over a predefined time being below a third threshold.

9. The network node of claim 8, wherein the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

10. The network node of claim 6, wherein the plurality of serving cells are configured for intra-band carrier aggregation.

11. A method implemented by a wireless device that is configured to communicate with a network node, the method comprising:

entering a first mode of a Radio Link Procedure, RLP, for a plurality of serving cells of a power savings group, PSG, based at least on the plurality of serving cells meeting at least a first criterion, the at least first criterion being met based on one or more layer-1 signal measurements;

determining a first serving cell of the plurality of serving cells fail to meet at least a second criterion;

reverting to a second mode of the RLP for the first serving cell based on the determination that the first serving cell fails to meet the at least second criterion; and reverting to the second mode for the remaining serving cells of the plurality of serving cells based on the determination that the first serving cell fails to meet the at least second criterion; and the first mode being associated with a first measurement period greater than a second measurement period of the second mode.

12. The method of claim 11, wherein the at least first criterion is based on at least one of:

a speed of the wireless device;

a location of the wireless device in a serving cell; and a variation in a radio condition for the wireless device.

13. The method of claim 12, wherein the at least first criterion is met based one at least one of:

the speed of the wireless device being below a first threshold;

a signal measurement of a serving cell being above a second threshold; and a variation in signal measurements over a predefined time being below a third threshold.

14. The method of claim 13, wherein the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

15. The method of claim 11, wherein the plurality of serving cells is configured for intra-band carrier aggregation.

16. A method implemented by a network node configured to communicate with a wireless device, the method comprising:

configuring at least a first criterion for the wireless device to use to:

enter a first mode of a Radio Link Procedure, RLP, for a plurality of serving cells of a power savings group, PSG, based at least on the plurality of serving cells meeting the at least first criterion, the at least first criterion being met based on one or more layer-1 signal measurements; and revert to a second mode for a plurality of severing cells of the PSG based at least on one severing cell of the plurality of serving cells failing to meet the at least a second criterion, the first mode being associated with a first measurement period greater than a second measurement period of the second mode; and transmitting information to the wireless device associated with one of the at least first criterion and the at least second criterion.

17. The method of claim 16, wherein the at least first criterion is based on at least one of:

a speed of the wireless device;

a location of the wireless device in a serving cell; and a variation in a radio condition for the wireless device.

18. The method of claim 16, wherein the at least first criterion is met based on at least one of:

the speed of the wireless device being below a first threshold;

a signal measurement of a serving cell being above a second threshold; and a variation in signal measurements over a predefined time being below a third threshold.

19. The method of claim 18, wherein the signal measurement is based on the measurement of at least one of a path loss, reference signal received power, RSRP, reference signal received quality, RSRQ, signal to noise ratio, SNR, signal to interference ratio, SINR, layer 1-RSRP, layer 1-SINR, and channel quality indicator, CQI.

20. The method of claim 16, wherein the plurality of serving cells are configured for intra-band carrier aggregation.

\* \* \* \* \*